United States Patent
Corbett et al.

(10) Patent No.: US 7,376,796 B2
(45) Date of Patent: May 20, 2008

(54) LIGHTWEIGHT COHERENCY CONTROL PROTOCOL FOR CLUSTERED STORAGE SYSTEM

(75) Inventors: Peter F. Corbett, Lexington, MA (US); J. Christopher Wagner, Langley, WA (US)

(73) Assignee: Network Appliance, Inc., Sunnyvale, CA (US)

( * ) Notice: Subject to any disclaimer, the term of this patent is extended or adjusted under 35 U.S.C. 154(b) by 266 days.

(21) Appl. No.: 11/264,601

(22) Filed: Nov. 1, 2005

(65) Prior Publication Data

US 2007/0101069 A1 May 3, 2007

(51) Int. Cl.
G06F 12/08 (2006.01)
(52) U.S. Cl. ..................... 711/141; 711/144
(58) Field of Classification Search ............. None
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |
| 4,899,342 A | 2/1990 | Potter et al. | |
| 4,989,206 A | 1/1991 | Dunphy, Jr. et al. | |
| 5,124,987 A | 6/1992 | Milligan et al. | |
| RE34,100 E | 10/1992 | Hartness | |
| 5,155,835 A | 10/1992 | Belsan | |

(Continued)

FOREIGN PATENT DOCUMENTS

EP 0563622 A2 10/1993

(Continued)

OTHER PUBLICATIONS

Notification of Transmittal of the International Search Report and the Written Opinion of the International Searching Authority or the Declaration, PCT/US2006/041554, Mar. 9, 2007.

(Continued)

*Primary Examiner*—T Nguyen
(74) *Attorney, Agent, or Firm*—Cesari and McKenna LLP

(57) ABSTRACT

A lightweight coherency control protocol ensures consistency of data containers, such as a file, and associated data buffers stored on one or more volumes served by a plurality of nodes, e.g., storage systems, connected as a cluster. Each data buffer is associated with a current cache sequence number comprising a load generation value and an update count value. The load generation value is incremented every time an inode of a file is loaded into a memory of the storage system. Once the inode is loaded and its load generation value is set, then the appropriate buffer of a buffer tree for the file is loaded into the memory. The update count value is incremented each time the buffer is updated with a write request/operation. Therefore, each buffer loaded into memory is tagged with the load generation value and an update count from the time that buffer is loaded.

21 Claims, 17 Drawing Sheets

U.S. PATENT DOCUMENTS

| | | | |
|---|---|---|---|
| 5,426,747 | A | 6/1995 | Weinreb et al. |
| 5,581,724 | A | 12/1996 | Belsan et al. |
| 5,819,292 | A | 10/1998 | Hitz et al. |
| 5,864,837 | A * | 1/1999 | Maimone ........................ 707/1 |
| 6,636,879 | B1 | 10/2003 | Doucette et al. |
| 6,671,773 | B2 | 12/2003 | Kazar et al. |
| 6,782,389 | B1 * | 8/2004 | Chrin et al. ................... 707/10 |
| 2004/0139161 | A1 | 7/2004 | Loh |
| 2005/0108300 | A1 | 5/2005 | Findleton et al. |
| 2005/0144178 | A1 * | 6/2005 | Chrin et al. ................ 707/100 |
| 2005/0192932 | A1 | 9/2005 | Kazar et al. |
| 2005/0246401 | A1 | 11/2005 | Edwards et al. |
| 2005/0278383 | A1 | 12/2005 | Kazar |

FOREIGN PATENT DOCUMENTS

| | | |
|---|---|---|
| WO | WO 89/10594 | 11/1989 |

OTHER PUBLICATIONS

Administration Guide found at http://www.openafs.org/pages/doc/AdminGuide/auagd010.htm, visited on Mar. 2, 2005.

Basilico, et al., *Error Correction System Using "Shadow Memory,"* IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981 © 1981, 1999.

Borenstein, Nathaniel S., *CMU's Andrew project a retrospective*, Communications of ACM, 39(12), Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Applications System /400 Performance Characteristics*, IBM Systems Journal, 28(3): 407-423, 1989.

Clark, Timothy A., et al., *Using the ISIS Resource Manager for Distributed, Fault-Tolerant Computing*, IEEE 1993, pp. 257-265.

Data Sheet for the Check Point Software Technologies product Flood-Gate-1 (1997).

Dibble, Peter C., et al., Beyond Striping: The Bridge Multiprocessor File System, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{copy of article I have has no date or cite}.

Gait, Jason, *Phoenix: A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

*The IBM System/38*, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., Et Al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62. Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhot, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective On The Sprite Network Operating System*, found at http://www,cs,berkeley.edu/projects/sprite/retrospective.html,visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*. University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*. In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. And Computer Sciences, Univ. of CA, presented at Summer '90 USENIX Technical Conference, Anaheim, CA Jun. 1990.

Rosenblum, Mendel, et al., The *Design and Implementation of a Log-Structured File System* Jul. 24, 1991, pp. 1-15.

Rosenblum, Mendel, et al., *The Design and Implementation of a Log-Structured File System*, . In Proceedings of ACM Transactions on Computer Systems, (10):26-52, Feb. 1992.

Sandberg, Russel et al., *Design and implementation of the Sun Network Filesystem*. In Proc. Summer 1985 USENIX Conf., pp. 119-130, Portland OR (USA), Jun. 1985.

Santry, Douglas S., et al., *Deciding When to Forget in the Elephant File System*. Operating Systems Review, 34(5), (Dec. 1999) pp. 110-123.

Satyanarayanan, M., et al., *The ITC Distributed File System: Principles and Design*. In Proceedings of the 10th ACM Symposium on Operating Systems Principles, (19)5:56-67, Dec. 1985.

Satyanarayanan,.M.. *A survey of distributed file-systems*. Annual Review of Computing Science, 4(73-104), 1989.

Satyanarayanan, M., et al, *Coda: A highly available file system for a distributed workstation environment* Carnegie Mellon University, CMU-ITC.

Satyanarayanan, M., et al, *Coda: A highly available file system for a distributed workstation environment*. IEEE Transactions on Computers, 39(4):447-459, 1990.

Satyanarayanan, Mahadev, *Scalable, Secure, and Highly Available Distributed File Access*, Computer May 1990: 9-21.

Sidebotham, Bob, *Volumes: The Andrew File System Data Structuring Primitive*, EEUG Conference Proceedings, Manchester, UK, Autumn 1986.

User Guide found at http://www.openafs.org/pages/doc/UserGuide/auusg004.htm, visited on Mar. 2, 2005.

Welch, Brent B., et al., *Pseudo Devices: User-Level Extensions to the Sprite File System*, Computer Science Division, Department of Electrical Engineering and Computer Sciences, Univ. of CA, Berkley, Apr. 1988.

Welch, Brent B., et al., *Pseudo-File-Systems*, Computer Science Division, Department of Electrical Engineering and Computer Sciences, Univ. of CA, Berkley, Oct. 1989.

Wittle, Mark, et al, *LADDIS: The next generation in NFS file server benchmarking*, USENIX Association Conference Proceedings, Apr. 1993.

\* cited by examiner

LIGHTWEIGHT COHERENCY CONTROL PROTOCOL FOR CLUSTERED STORAGE SYSTEM

FIELD OF THE INVENTION

The present invention relates to clustered computer environments and, more particularly, to ensuring consistency of data containers served by storage systems interconnected as a cluster.

BACKGROUND OF THE INVENTION

A storage system typically comprises one or more storage devices into which information may be entered, and from which information may be obtained, as desired. The storage system includes a storage operating system that functionally organizes the system by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

The storage operating system of the storage system may implement a high-level module, such as a file system, to logically organize the information stored on volumes as a hierarchical structure of data containers, such as files and logical units. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system.

A known type of file system is a write-anywhere file system that does not over-write data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The storage system may be further configured to operate according to a client/server model of information delivery to thereby allow many clients to access data containers stored on the system. In this model, the client may comprise an application, such as a database application, executing on a computer that "connects" to the storage system over a computer network, such as a point-to-point link, shared local area network (LAN), wide area network (WAN), or virtual private network (VPN) implemented over a public network such as the Internet. Each client may request the services of the storage system by issuing file-based and block-based protocol messages (in the form of packets) to the system over the network.

A plurality of storage systems may be interconnected to provide a storage system environment configured to service many clients. Each storage system may be configured to service one or more volumes, wherein each volume stores one or more data containers. Yet often a large number of data access requests issued by the clients may be directed to a small number of data containers serviced by a particular storage system of the environment. A solution to such a problem is to distribute the volumes serviced by the particular storage system among all of the storage systems of the environment. This, in turn, distributes the data access requests, along with the processing resources needed to service such requests, among all of the storage systems, thereby reducing the individual processing load on each storage system. However, a noted disadvantage arises when only a single data container, such as a file, is heavily accessed by clients of the storage system environment. As a result, the storage system attempting to service the requests directed to that file may exceed its processing resources and become overburdened, with a concomitant degradation of speed and performance.

One technique for overcoming the disadvantages of having a single file that is heavily utilized is to stripe the file across a plurality of volumes configured as a striped volume set (SVS), where each volume, such as a data volume (DV), is serviced by a different storage system, thereby distributing the load for the single file among a plurality of storage systems. A technique for data container (such as a file) striping is described in U.S. patent application Ser. No. 11/119,278, entitled STORAGE SYSTEM ARCHITECTURE FOR STRIPING DATA CONTAINER CONTENT ACROSS VOLUMES OF A CLUSTER, which application is hereby incorporated by reference as though fully set forth herein. According to the data container striping arrangement, each storage system may service access requests (i.e., file operations) from clients directed to the same file. File operations, such as read and write operations, are forwarded directly to the storage systems that are responsible for their portions of the data for that file.

An exemplary distributed multi-storage system architecture may comprise a plurality of storage systems organized as a cluster, wherein each storage system includes a thin front-end element that performs protocol conversion of file access protocols into a common cluster protocol for communicating with a back-end element of a storage system. The front-end element includes a local cache memory for temporarily storing ("caching") data to serve client requests faster and more efficiently. Each back-end element serves one or more particular files or particular regions of files and, as such, maintains an authoritative version of the files or regions of files.

A front-end element of the cluster that receives a client request directed to a file initially attempts to serve that request from its local cache. However, the front-end element may not know whether its local cache is up-to-date because there may be another front-end element of the cluster that is also writing to that same file. Write requests are "pushed through" (forwarded) to the appropriate back-end element, whereas read requests are attempted to be serviced first from the local cache of the front-end element or, alternatively, at the appropriate back-end element. An issue with this clustered storage system architecture involves ensuring that a copy of a region of file data (i.e., a data buffer) stored in a local cache of a front-end element is up-to-date ("coherent") with respect to the authoritative copy of that data at the back-end element.

An approach to ensuring coherency of data in a clustered multi-storage system having front-end and back-end elements involves distributed locking using file locks, such as range locks and/or opportunistic locks (op-locks). A range lock is a hard lock that provides exclusive access to a specific byte range within a file. The range lock is established upon request by a caller (such as a front-end element) and is released only at the request of the lock's owner (such as a back-end element). The front-end element can request and be granted a range lock that enables exclusive access to the corresponding range of the file so that it performs write operations on cached data until the back-end element instructs it to release the lock.

An op-lock is an automatically revocable soft lock that allows the front-end element to operate on a file data until such time as a conflicting operation is attempted. The front-end element can cache the data and perform read and write operations on the cached data because it knows that no other access is allowed to that data as long as it has an op-lock on the file. As soon as a second front-end element attempts a conflicting operation on the file, the back-end element blocks the conflicting operation and revokes the op-lock. In particular, the back-end element instructs the front-end element to return ("flush") any write modifications to the back-end element and then discard the entire content of its local cache. The back-end element then unblocks the second front-end element and grants it an op-block to the file.

However, substantial overhead is required with respect to maintenance and utilization of such a distributed file system cache of file data in the clustered storage system using distributed locks. The present invention is directed to a system and method that reduces the overhead of maintaining data coherency in a clustered storage system.

SUMMARY OF THE INVENTION

The invention overcomes the disadvantages of the prior art by providing a light-weight coherency control protocol for ensuring consistency of data containers and associated data buffers stored on one or more volumes served by a plurality of nodes, e.g., storage systems, connected as a cluster. Each storage system of the cluster includes (i) a disk element (D-module) adapted to service one or more volumes of the cluster and (ii) a network element (N-module) adapted to redirect a data access request for a data container to any D-module of the cluster. The D-module maintains an authoritative version of the data container, such as a file, or region (data buffer) of the file. Notably, a local cache memory is provided on the N-module to enable caching of data buffers and serving of data access requests on that module. Each file is illustratively identified by a file identifier (file ID) and each data buffer is represented by a file block number (fbn) that identifies the position or offset of the buffer within the file.

According to an aspect of the invention, each data buffer is associated with a current cache sequence number comprising a load generation value and an update count value. The load generation value is incremented every time an inode of a file is loaded into a memory of the D-module. Once the inode is loaded and its load generation value is set, then the appropriate data buffer of a buffer tree for the file is loaded into the memory. The update count value is incremented each time the buffer is updated with a write request/operation. Therefore, each data buffer loaded into memory is tagged with the load generation value and an update count from the time that buffer is loaded.

Broadly stated, in response to receiving the data access (read) request from a client that is directed to a file, an N-module forwards a message to the appropriate D-module to validate the particular file and data buffer that the N-module attempts to serve. The D-module retrieves the inode of the requested file and determines whether the data buffer is cached at the N-module and, if so, whether that cached copy is representative of the most recent version of the data buffer (as denoted by the current cache sequence number). If the copy of the data buffer cached at the N-module represents the most recent version of the buffer, the D-module returns a response to the N-module indicating that the cached buffer can be used to service the read request. Otherwise, the D-module returns (i) a copy of the updated data buffer to the N-module as part of the response or (ii) a response indicating that the cached buffer is "stale". In the latter case, the N-module then forwards a message to the D-module requesting the updated data buffer.

Advantageously, the invention enables distribution of a file system buffer cache across multiple storage systems of the cluster in a coherent manner. In other words, the invention ensures data coherency across the nodes because it maintains a single point of control for each file, i.e., the D-module that owns that file. Furthermore, the inventive coherency control protocol does not require the use of distributed locking, such as range locks, as commonly used with prior distributed multi-storage system architectures.

BRIEF DESCRIPTION OF THE DRAWINGS

The above and further advantages of invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Cluster Environment

Figure 1:
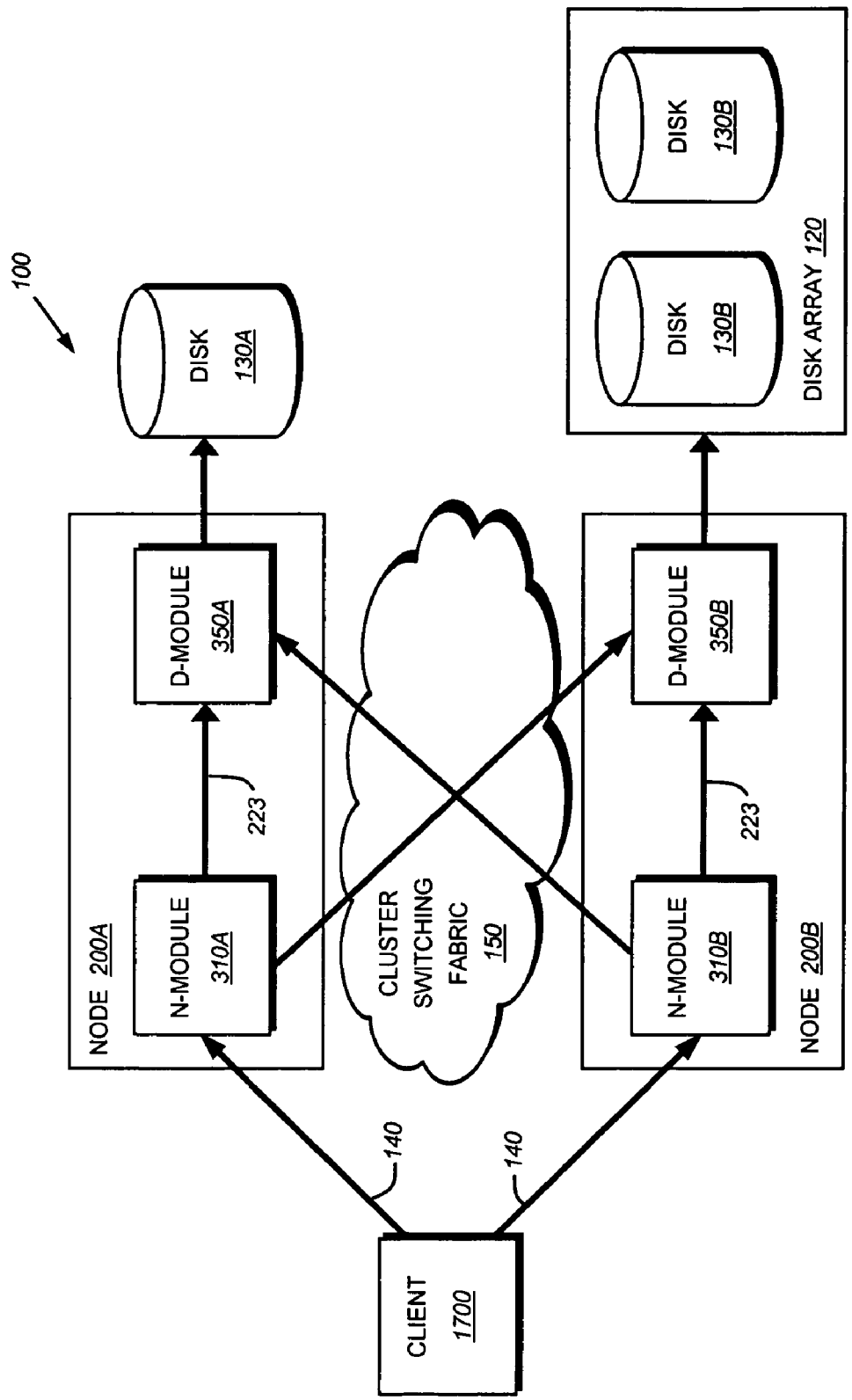
FIG. 1 is a schematic block diagram of a plurality of nodes interconnected as a cluster in accordance with an embodiment of the present invention.

FIG. 1 is a schematic block diagram of a plurality of nodes 200 interconnected as a cluster 100 and configured to provide storage service relating to the organization of information on storage devices. The nodes 200 comprise various functional components that cooperate to provide a distributed storage system architecture of the cluster 100. To that end, each node 200 is generally organized as a network element (N-module 310) and a disk element (D-module 350). The N-module 310 includes functionality that enables the node 200 to connect to clients 180 over a computer network 140, while each D-module 350 connects to one or more storage devices, such as disks 130 of a disk array 120. The nodes 200 are interconnected by a cluster switching fabric 150 which, in the illustrative embodiment, may be embodied as a Gigabit Ethernet switch. An exemplary distributed file system architecture is generally described in U.S. Patent Application Publication No. US 2002/0116593 titled METHOD AND SYSTEM FOR RESPONDING TO FILE SYSTEM REQUESTS, by M. Kazar et al. published Aug. 22, 2002. It should be noted that while there is shown an equal number of N and D-modules in the illustrative cluster 100, there may be differing numbers of N and/or D-modules in accordance with various embodiments of the present invention. For example, there may be a plurality of N-modules and/or D-modules interconnected in a cluster configuration 100 that does not reflect a one-to-one correspondence between the N and D-modules. As such, an N-module or D-module may be embodied as a node 200. Therefore, the description of a node 200 comprising one N-module and one D-module should be taken as illustrative only.

The clients 180 may be general-purpose computers configured to interact with the node 200 in accordance with a client/server model of information delivery. That is, each client may request the services of the node, and the node may return the results of the services requested by the client, by exchanging packets over the network 140. The client may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

B. Storage System Node

Figure 2:
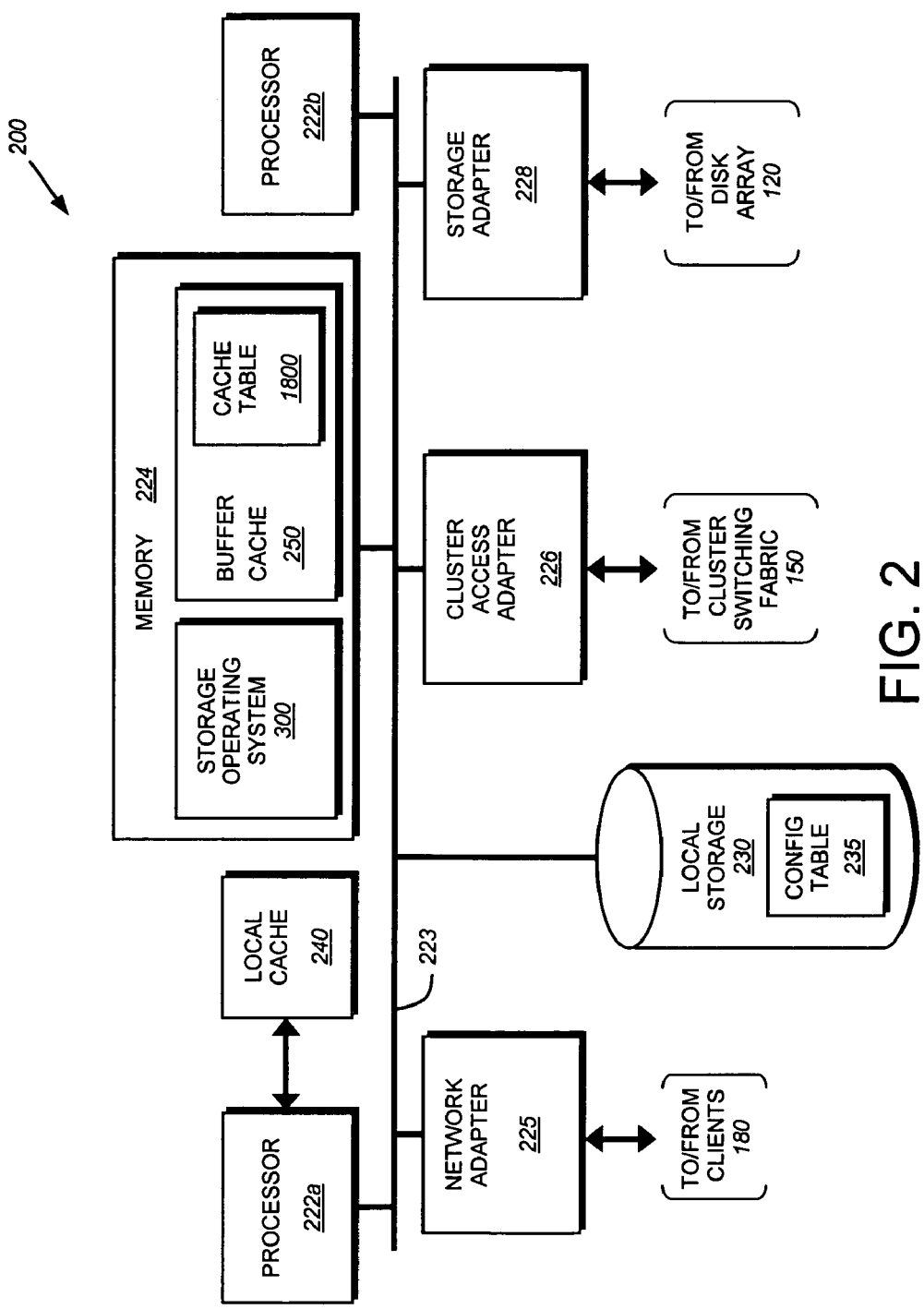
FIG. 2 is a schematic block diagram of a node, such as a storage system, in accordance with an embodiment of the present invention.

FIG. 2 is a schematic block diagram of a node 200 that is illustratively embodied as a storage system comprising a plurality of processors 222a, b, a memory 224, a network adapter 225, a cluster access adapter 226, a storage adapter 228 and local storage 230 interconnected by a system bus 223. The local storage 230 comprises one or more storage devices, such as disks, utilized by the node to locally store configuration information (e.g., in configuration table 235) provided by one or more management processes that execute as user mode applications 1100 (see FIG. 11). The cluster access adapter 226 comprises a plurality of ports adapted to couple the node 200 to other nodes of the cluster 100. In the illustrative embodiment, Ethernet is used as the clustering protocol and interconnect media, although it will be apparent to those skilled in the art that other types of protocols and interconnects may be utilized within the cluster architecture described herein. In alternate embodiments where the N-modules and D-modules are implemented on separate storage systems or computers, the cluster access adapter 226 is utilized by the N/D-module for communicating with other N/D-modules in the cluster 100.

Each node 200 is illustratively embodied as a dual processor storage system executing a storage operating system 300 that preferably implements a high-level module, such as a file system, to logically organize the information as a hierarchical structure of named data containers, such as directories, files and special types of files called virtual disks (hereinafter generally "blocks") on the disks. However, it will be apparent to those of ordinary skill in the art that the node 200 may alternatively comprise a single or more than two processor system. Illustratively, one processor 222a executes the functions of the N-module 310 on the node, while the other processor 222b executes the functions of the D-module 350.

The present invention is illustratively implemented on the cluster 100 by extending the distributed storage system architecture to allow data caching on N-modules 310 using a novel lightweight coherency control protocol. As described herein, each D-module 350 services one or more particular files or particular regions of files and, accordingly, maintains an authoritative version of the file and/or region (data buffer) of the file. However, the use of data caching (i.e., caching of data buffers) enables the N-modules to serve client requests directed to data containers, such as files, faster and more efficiently than having to always redirect requests to the appropriate D-modules. Accordingly, a local cache memory ("local cache" 240) illustratively adapted to provided such data caching is associated with the processor 222a executing the functions of the N-module. The inventive coherency protocol may be easily implemented on the distributed architecture because the protocol operates at the inode and buffer level. In addition, the invention may be employed in clustered storage system architectures where the distance between storage systems is significant, thus rendering the front-end cache a "remote" cache.

The memory 224 illustratively comprises storage locations that are addressable by the processors and adapters for storing software program code. A portion of the memory may be further organized as a "buffer cache" 250 for storing certain data structures associated with the present invention. The processor and adapters may, in turn, comprise processing elements and/or logic circuitry configured to execute the software code and manipulate the data structures. The storage operating system 300, portions of which is typically resident in memory and executed by the processing elements, functionally organizes the node 200 by, inter alia, invoking storage operations in support of the storage service implemented by the node. It will be apparent to those skilled in the art that other processing and memory means, including various computer readable media, may be used for storing and executing program instructions pertaining to the invention described herein.

The network adapter 225 comprises a plurality of ports adapted to couple the node 200 to one or more clients 180 over point-to-point links, wide area networks, virtual private networks implemented over a public network (Internet) or a shared local area network. The network adapter 225 thus may comprise the mechanical, electrical and signaling circuitry needed to connect the node to the network. Illustratively, the computer network 140 may be embodied as an Ethernet network or a Fibre Channel (FC) network. Each client 180 may communicate with the node over network 140 by exchanging discrete frames or packets of data according to pre-defined protocols, such as TCP/IP.

The storage adapter 228 cooperates with the storage operating system 300 executing on the node 200 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130 of array 120. The storage adapter comprises a plurality of ports having input/output (I/O) interface circuitry that couples to the disks over an I/O interconnect arrangement, such as a conventional high-performance, FC link topology.

Storage of information on each array 120 is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

C. Storage Operating System

To facilitate access to the disks 130, the storage operating system 300 implements a write-anywhere file system that cooperates with one or more virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 3:
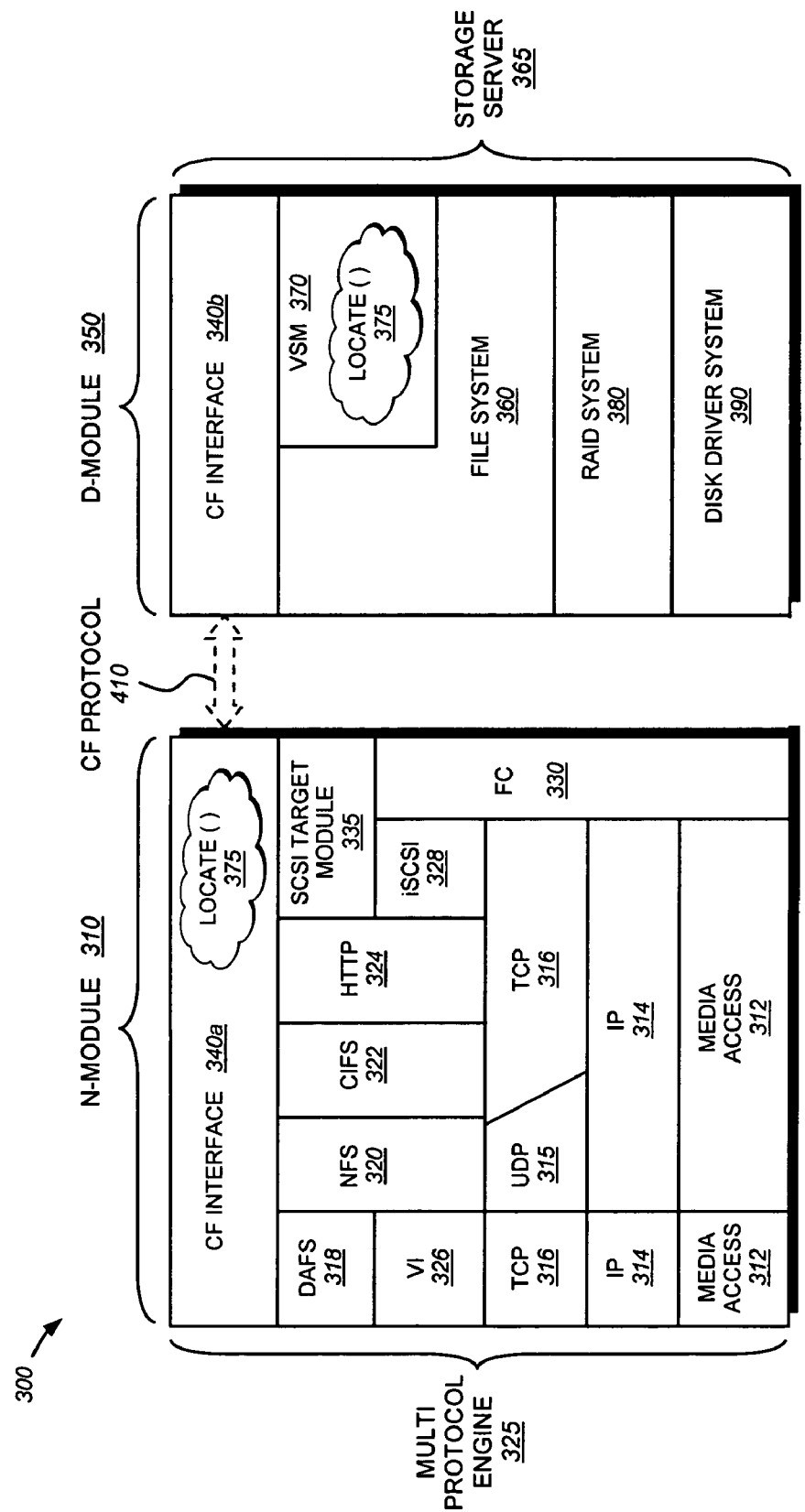
FIG. 3 is a schematic block diagram of a storage operating system that may be advantageously used with the present invention.

FIG. 3 is a schematic block diagram of the storage operating system 300 that may be advantageously used with the present invention. The storage operating system comprises a series of software layers organized to form an integrated network protocol stack or, more generally, a multi-protocol engine 325 that provides data paths for clients to access information stored on the node using block and file access protocols. The multiprotocol engine includes a media access layer 312 of network drivers (e.g., gigabit Ethernet drivers) that interfaces to network protocol layers, such as the IP layer 314 and its supporting transport mechanisms, the TCP layer 316 and the User Datagram Protocol (UDP) layer 315. A file system protocol layer provides multi-protocol file access and, to that end, includes support for the Direct Access File System (DAFS) protocol 318, the NFS protocol 320, the CIFS protocol 322 and the Hypertext Transfer Protocol (HTTP) protocol 324. A VI layer 326 implements the VI architecture to provide direct access transport (DAT) capabilities, such as RDMA, as required by the DAFS protocol 318. An iSCSI driver layer 328 provides block protocol access over the TCP/IP network protocol layers, while a FC driver layer 330 receives and transmits block access requests and responses to and from the node. The FC and iSCSI drivers provide FC-specific and iSCSI-specific access control to the blocks and, thus, manage exports of luns to either iSCSI or FCP or, alternatively, to both iSCSI and FCP when accessing the blocks on the node 200.

In addition, the storage operating system includes a series of software layers organized to form a storage server 365 that provides data paths for accessing information stored on the disks 130 of the node 200. To that end, the storage server 365 includes a file system module 360 in cooperating relation with a volume striping module (VSM) 370, a RAID system module 380 and a disk driver system module 390. The RAID system 380 manages the storage and retrieval of information to and from the volumes/disks in accordance with I/O operations, while the disk driver system 390 implements a disk access protocol such as, e.g., the SCSI protocol. The VSM 370 illustratively implements a striped volume set (SVS) described herein. As described further herein, the VSM cooperates with the file system 360 to enable storage server 365 to service a volume of the SVS. In particular, the VSM 370 implements a locate( ) function 375 to compute the location of data container content in the SVS volume to thereby ensure consistency of such content served by the cluster.

The file system 360 implements a virtualization system of the storage operating system 300 through the interaction with one or more virtualization modules illustratively embodied as, e.g., a virtual disk (vdisk) module (not shown) and a SCSI target module 335. The vdisk module enables access by administrative interfaces, such as a user interface of a management framework 1110 (see FIG. 11), in response to a user (system administrator) issuing commands to the node 200. The SCSI target module 335 is generally disposed between the FC and iSCSI drivers 328, 330 and the file system 360 to provide a translation layer of the virtualization system between the block (lun) space and the file system space, where luns are represented as blocks.

The file system 360 is illustratively a message-based system that provides logical volume management capabilities for use in access to the information stored on the storage devices, such as disks. That is, in addition to providing file system semantics, the file system 360 provides functions normally associated with a volume manager. These functions include (i) aggregation of the disks, (ii) aggregation of storage bandwidth of the disks, and (iii) reliability guarantees, such as mirroring and/or parity (RAID). The file system 360 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as timestamps, access permissions, size and block location). The file system uses files to store meta-data describing the layout of its file system; these meta-data files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 180 is forwarded as a packet over the computer network 140 and onto the node 200 where it is received at the network adapter 225. A network driver (of layer 312 or layer 330) processes the packet and, if appropriate, passes it onto a network protocol and file access layer for additional processing prior to forwarding to the write-anywhere file system 360. Here, the file system generates operations to load (retrieve) the requested data from disk 130 if it is not resident "in core", i.e., in memory 224. If the information is not in memory, the file system 360 indexes into the inode file using the inode number to access an appropriate entry and retrieve a logical vbn. The file system then passes a message structure including the logical vbn to the RAID system 380; the logical vbn is mapped to a disk identifier and disk block number (disk,dbn) and sent to an appropriate driver (e.g., SCSI) of the disk driver system 390. The disk driver accesses the dbn from the specified disk 130 and loads the requested data block(s) in memory for processing by the node. Upon completion of the request, the node (and operating system) returns a reply to the client 180 over the network 140.

It should be noted that the software "path" through the storage operating system layers described above needed to perform data storage access for the client request received at the node may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by node 200 in response to a request issued by client 180. Moreover, in another alternate embodiment of the invention, the processing elements of adapters 225, 228 may be configured to offload some or all of the packet processing and storage access operations, respectively, from processor 222, to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node 200, implement data access semantics of a general purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose node or computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present invention may be utilized with any suitable file system, including a write in place file system.

D. CF Protocol

In the illustrative embodiment, the storage server 365 is embodied as D-module 350 of the storage operating system 300 to service one or more volumes of array 120. In addition, the multi-protocol engine 325 is embodied as N-module 310 to (i) perform protocol termination with respect to a client issuing incoming data access request packets over the network 140, as well as (ii) redirect those data access requests to any storage server 365 of the cluster 100. Moreover, the N-module 310 and D-module 350 cooperate to provide a highly-scalable, distributed storage system architecture of the cluster 100. To that end, each module includes a cluster fabric (CF) interface module 340*a,b* adapted to implement intra-cluster communication among the modules, including D-module-to-D-module communication, for data container striping operations described herein.

The protocol layers, e.g., the NFS/CIFS layers and the iSCSI/FC layers, of the N-module 310 function as protocol servers that translate file-based and block based data access requests from clients into CF protocol messages used for communication with the D-module 350. That is, the N-module servers convert the incoming data access requests into file system primitive operations (commands) that are embedded within CF messages by the CF interface module 340 for transmission to the D-modules 350 of the cluster 100. Notably, the CF interface modules 340 cooperate to provide a single file system image across all D-modules 350 in the cluster 100. Thus, any network port of an N-module that receives a client request can access any data container within the single file system image located on any D-module 350 of the cluster.

Further to the illustrative embodiment, the N-module 310 and D-module 350 are implemented as separately-scheduled processes of storage operating system 300; however, in an alternate embodiment, the modules may be implemented as pieces of code within a single operating system process. Communication between an N-module and D-module is thus illustratively effected through the use of message passing between the modules although, in the case of remote communication between an N-module and D-module of different nodes, such message passing occurs over the cluster switching fabric 150. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from Network Appliance, Inc. The SpinFS protocol is described in the above-referenced U.S. Patent Application Publication No. US 2002/0116593.

The CF interface module 340 implements the CF protocol for communicating file system commands among the modules of cluster 100. Communication is illustratively effected by the D-module exposing the CF API to which an N-module (or another D-module) issues calls. To that end, the CF interface module 340 is organized as a CF encoder and CF decoder. The CF encoder of, e.g., CF interface 340*a* on N-module 310 encapsulates a CF message as (i) a local procedure call (LPC) when communicating a file system command to a D-module 350 residing on the same node 200 or (ii) a remote procedure call (RPC) when communicating the command to a D-module residing on a remote node of the cluster 100. In either case, the CF decoder of CF interface 340*b* on D-module 350 de-encapsulates the CF message and processes the file system command.

Figure 4:
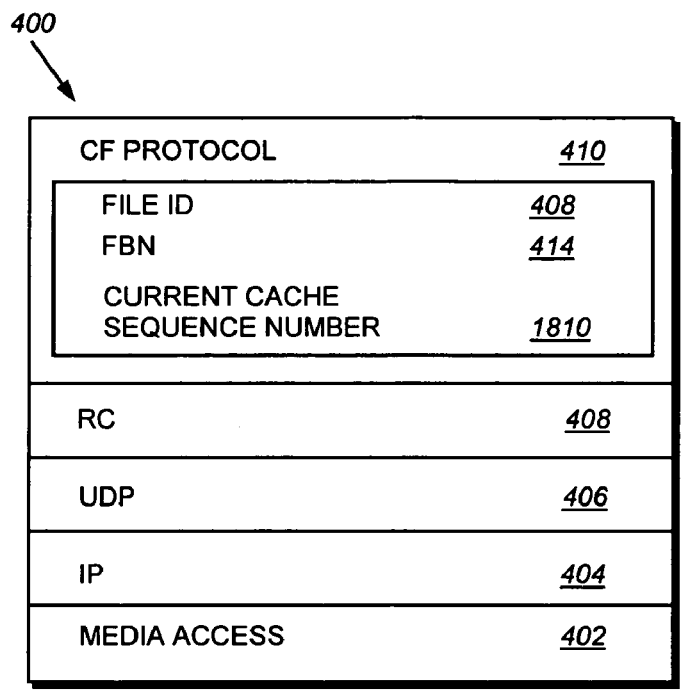
FIG. 4 is a schematic block diagram illustrating the format of a cluster fabric (CF) message in accordance with an embodiment of with the present invention.

FIG. 4 is a schematic block diagram illustrating the format of a CF message 400 in accordance with an embodiment of with the present invention. The CF message 400 is illustratively used for RPC communication over the switching fabric 150 between remote modules of the cluster 100; however, it should be understood that the term "CF message" may be used generally to refer to LPC and RPC communication between modules of the cluster. The CF message 400 includes a media access layer 402, an IP layer 404, a UDP layer 406, a reliable connection (RC) layer 408 and a CF protocol layer 410. As noted, the CF protocol is a generic file system protocol that conveys file system commands related to operations contained within client requests to access data containers stored on the cluster 100; the CF protocol layer 410 is that portion of message 400 that carries the file system commands, as well as other information related to the inventive coherency control protocol. Illustratively, the CF protocol is datagram based and, as such, involves transmission of messages or "envelopes" in a reliable manner from a source (e.g., an N-module 310) to a destination (e.g., a D-module 350). The RC layer 408 implements a reliable transport protocol that is adapted to process such envelopes in accordance with a connectionless protocol, such as UDP 406.

Figure 5:
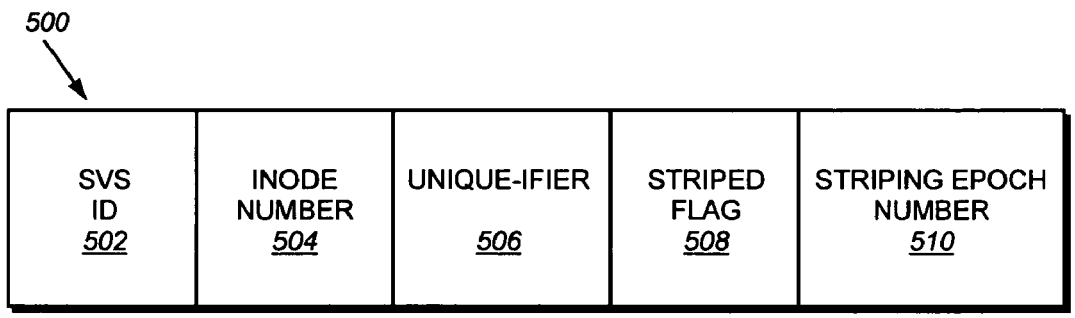
FIG. 5 is a schematic block diagram illustrating the format of a data container handle in accordance with an embodiment of the present invention.

A data container, e.g., a file, is accessed in the file system using a data container handle. FIG. 5 is a schematic block diagram illustrating the format of a data container handle 500 including a SVS ID field 502, an inode number field 504, a unique-ifier field 506, a striped flag field 508 and a striping epoch number field 510. The SVS ID field 502 contains a global identifier (within the cluster 100) of the SVS within which the data container resides. The inode number field 504 contains an inode number of an inode (within an inode file) pertaining to the data container. The unique-ifier field 506 contains a monotonically increasing number that uniquely identifies the data container handle 500. The unique-ifier is particularly useful in the case where an inode number has been deleted, reused and reassigned to a new data container. The unique-ifier distinguishes that reused inode number in a particular data container from a potentially previous use of those fields. The striped flag field 508 is illustratively a Boolean value that identifies whether the data container is striped or not. The striping epoch number field 510 indicates the appropriate striping technique for use with this data container for embodiments where the SVS utilizes differing striping techniques for different data containers.

E. File System Organization

Figure 6:
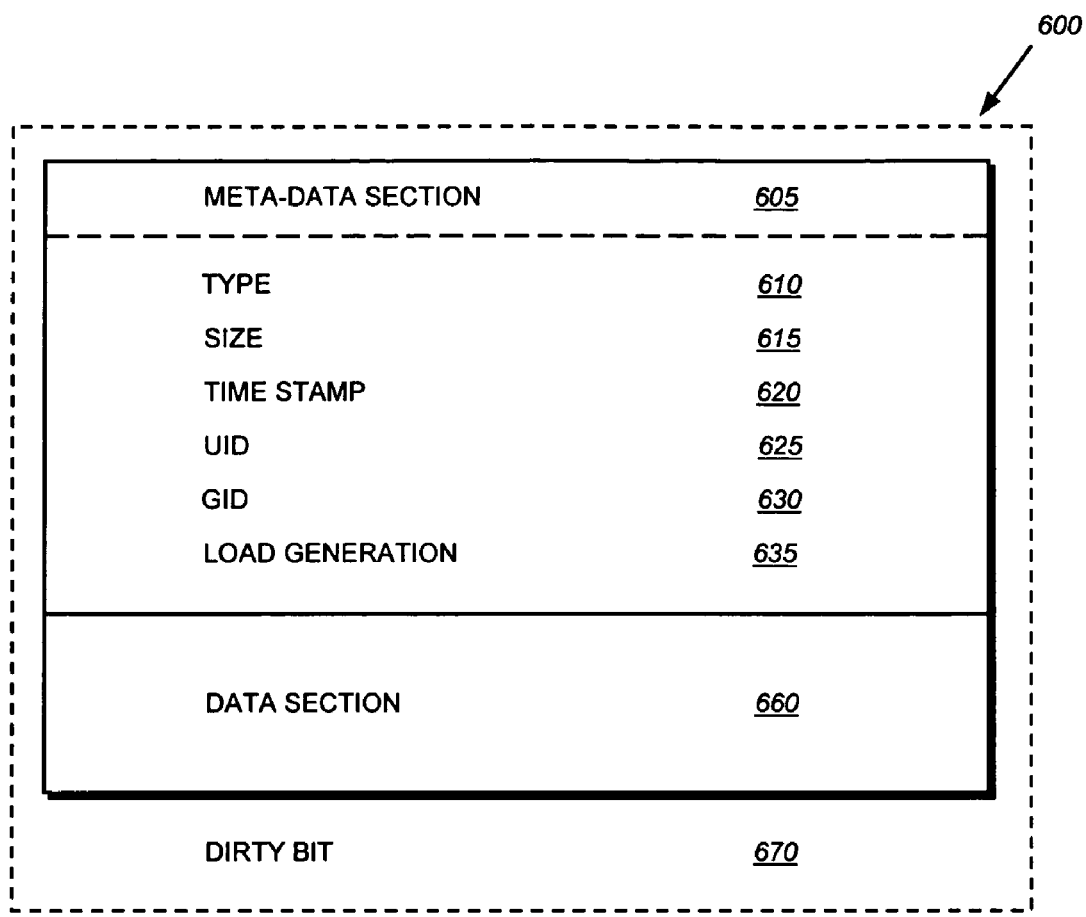
FIG. 6 is a schematic block diagram of an exemplary inode in accordance with an embodiment of the present invention.

In the illustrative embodiment, a data container is represented in the write-anywhere file system as an inode data structure adapted for storage on the disks 130. FIG. 6 is a schematic block diagram of an inode 600, which preferably includes a meta-data section 605 and a data section 660. The information stored in the meta-data section 605 of each inode 600 describes the data container (e.g., a file) and, as such, includes the type (e.g., regular, directory, vdisk) 610 of file, its size 615, timestamps (e.g., access and/or modification time) 620 and ownership, i.e., user identifier (UID 625) and group ID (GID 630), of the file. The meta-data section 605 also includes a load generation field 635 described further herein. The contents of the data section 660 of each inode may be interpreted differently depending upon the type of file (inode) defined within the type field 610. For example, the data section 660 of a directory inode contains meta-data controlled by the file system, whereas the data section of a regular inode contains file system data. In this latter case, the data section 660 includes a representation of the data associated with the file.

Specifically, the data section 660 of a regular on-disk inode may include file system data or pointers, the latter referencing 4 kB data blocks on disk used to store the file system data. Each pointer is preferably a logical vbn to facilitate efficiency among the file system and the RAID system 380 when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 660 of the inode (e.g., a second level inode) references an indirect block (e.g., a first level L1 block) that contains 1024 pointers, each of which references a 4 kB data block on disk. For file system data having a size greater than 64MB, each pointer in the data section 660 of the inode (e.g., a third level L3 inode) references a double-indirect block (e.g., a second level L2 block) that contains 1024 pointers, each referencing an indirect (e.g., a first level L1) block. The indirect block, in turn, contains 1024 pointers, each of which references a 4 kB data block on disk. When accessing a file, each block of the file may be loaded from disk 130 into the memory 224.

When an on-disk inode (or block) is loaded from disk 130 into memory 224, its corresponding in-core structure embeds the on-disk structure. For example, the dotted line surrounding the inode 600 indicates the in-core representation of the on-disk inode structure. The in-core structure is a block of memory that stores the on-disk structure plus additional information needed to manage data in the memory (but not on disk). The additional information may include, e.g., a "dirty" bit 670. After data in the inode (or block) is updated/modified as instructed by, e.g., a write operation, the modified data is marked "dirty" using the dirty bit 670 so that the inode (block) can be subsequently "flushed" (stored) to disk. The in-core and on-disk format structures of the WAFL file system, including the inodes and inode file, are disclosed and described in the previously incorporated U.S. Pat. No. 5,818,292 titled METHOD FOR MAINTAINING CONSISTENT STATES OF A FILE SYSTEM AND FOR CREATING USER-ACCESSIBLE READ-ONLY COPIES OF A FILE SYSTEM by David Hitz et al., issued on Oct. 6, 1898.

Figure 7:
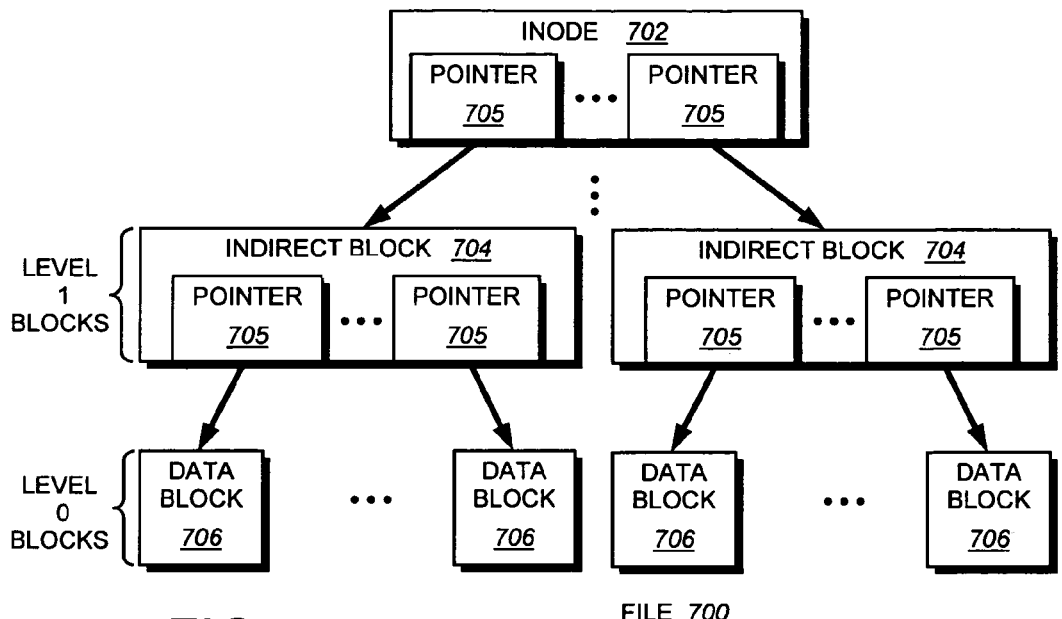
FIG. 7 is a schematic block diagram of an exemplary buffer tree in accordance with an embodiment of the present invention.

FIG. 7 is a schematic block diagram of an embodiment of a buffer tree of a file that may be advantageously used with the present invention. The buffer tree is an internal representation of blocks for a file (e.g., file 700) loaded into the memory 224 and maintained by the write-anywhere file system 360. That is, for each inode of a file, the file system 360 constructs an associated buffer tree in the buffer cache 250 for use, e.g., by the D-module 350. A root (top-level) inode 702, such as an embedded inode, references indirect (e.g., level 1) blocks 704. Note that there may be additional levels of indirect blocks (e.g., level 2, level 3) depending upon the size of the file. The indirect blocks (and inode) contain pointers 705 that ultimately reference data buffers (data blocks 706) used to store the actual data of the file. That is, the data of file 700 are contained in data blocks and the locations of these blocks are stored in the indirect blocks of the file. Each level 1 indirect block 704 may contain pointers to as many as 1024 data blocks. According to the "write anywhere" nature of the file system, these blocks may be located anywhere on the disks 130.

A file system layout is provided that apportions an underlying physical volume into one or more virtual volumes (or flexible volumes) of a storage system, such as node 200. An example of such a file system layout is described in U.S. patent application Ser. No. 10/836,817 titled EXTENSION OF WRITE ANYWHERE FILE SYSTEM LAYOUT, by John K. Edwards et al. and assigned to Network Appliance, Inc. The underlying physical volume is an aggregate comprising one or more groups of disks, such as RAID groups, of the node. The aggregate has its own physical volume block number (pvbn) space and maintains meta-data, such as block allocation structures, within that pvbn space. Each flexible volume has its own virtual volume block number (vvbn) space and maintains meta-data, such as block allocation structures, within that vvbn space. Each flexible volume is a file system that is associated with a container file; the container file is a file in the aggregate that contains all blocks used by the flexible volume. Morever, each flexible volume comprises data blocks and indirect blocks that contain block pointers that point at either other indirect blocks or data blocks.

In one embodiment, pvbns are used as block pointers within buffer trees of files (such as file 700) stored in a flexible volume. This "hybrid" flexible volume embodiment involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system 300.

Figure 8:
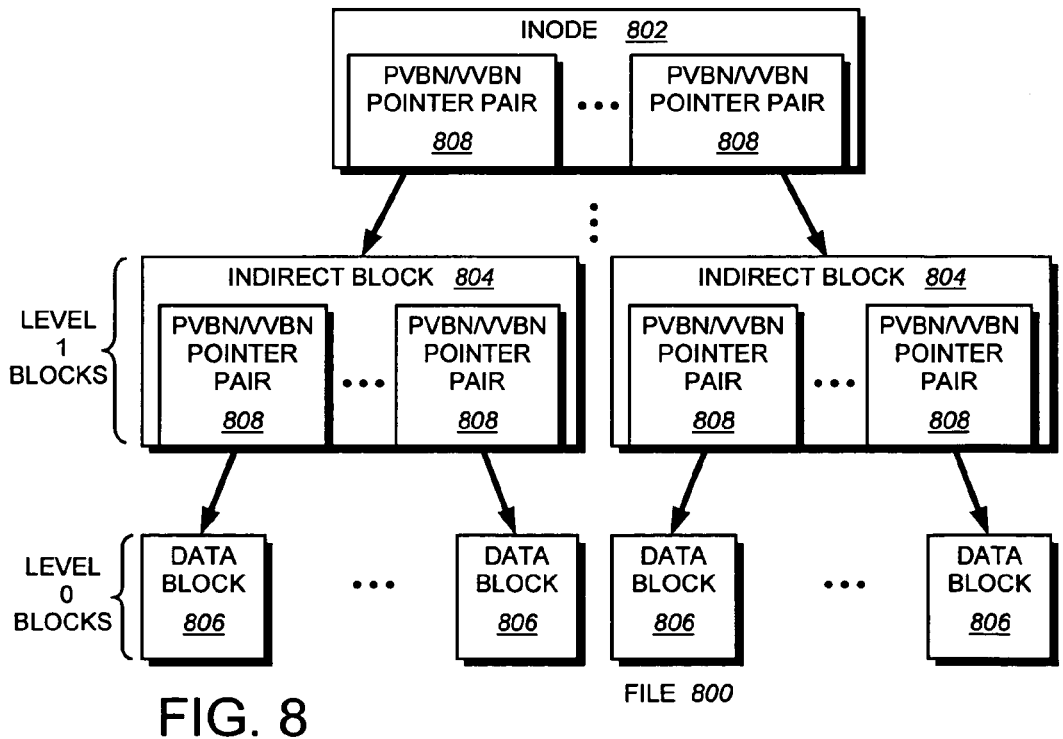
FIG. 8 is a schematic block diagram of an illustrative embodiment of a buffer tree of a file that may be advantageously used with the present invention.

In an illustrative dual vbn hybrid flexible volume embodiment, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1(L1) indirect blocks, inode file level 0(L0) blocks. FIG. 8 is a schematic block diagram of an illustrative embodiment of a buffer tree of a file 800 that may be advantageously used with the present invention. A root (top-level) inode 802, such as an embedded inode, references indirect (e.g., level 1) blocks 804. Note that there may be additional levels of indirect blocks (e.g., level 2, level 3) depending upon the size of the file. The indirect blocks (and inode) contain pvbn/vvbn pointer pair structures 808 that ultimately reference data buffers (data blocks 806) used to store the actual data of the file.

The pvbns reference locations on disks of the aggregate, whereas the vvbns reference locations within files of the flexible volume. The use of pvbns as block pointers 808 in the indirect blocks 804 provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

Figure 9:
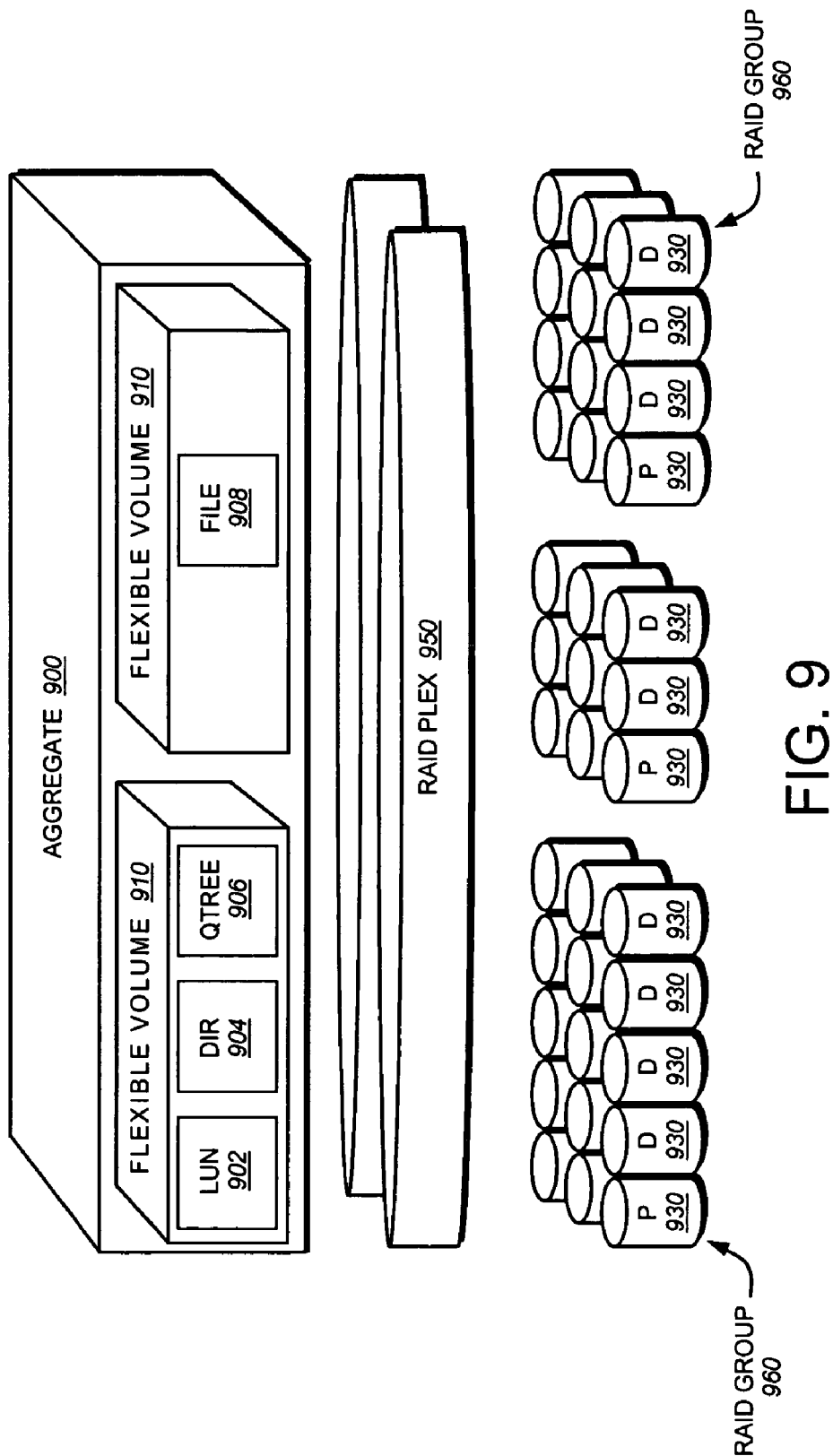
FIG. 9 is a schematic block diagram of an exemplary aggregate in accordance with an embodiment of the present invention.

FIG. 9 is a schematic block diagram of an embodiment of an aggregate 900 that may be advantageously used with the present invention. Luns (blocks) 902, directories 904, qtrees 906 and files 908 may be contained within flexible volumes 910, such as dual vbn flexible volumes, that, in turn, are contained within the aggregate 900. The aggregate 900 is illustratively layered on top of the RAID system, which is represented by at least one RAID plex 950 (depending upon whether the storage configuration is mirrored), wherein each plex 950 comprises at least one RAID group 960. Each RAID group further comprises a plurality of disks 930, e.g., one or more data (D) disks and at least one (P) parity disk.

Whereas the aggregate 900 is analogous to a physical volume of a conventional storage system, a flexible volume is analogous to a file within that physical volume. That is, the aggregate 900 may include one or more files, wherein each file contains a flexible volume 910 and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume 910 is also a logical volume, it has its own block allocation structures (e.g., active, space and summary maps) in its vvbn space.

A container file is a file in the aggregate that contains all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. The aggregate includes an illustrative hidden meta-data root directory that contains subdirectories of flexible volumes:

WAFL/fsid/filesystem file, storage label file

Specifically, a physical file system (WAFL) directory includes a subdirectory for each flexible volume in the aggregate, with the name of subdirectory being a file system identifier (fsid) of the flexible volume. Each fsid subdirectory (flexible volume) contains at least two files, a filesystem file and a storage label file. The storage label file is illustratively a 4 kB file that contains meta-data similar to that stored in a conventional raid label. In other words, the storage label file is the analog of a raid label and, as such, contains information about the state of the flexible volume such as, e.g., the name of the flexible volume, a universal unique identifier (uuid) and fsid of the flexible volume, whether it is online, being created or being destroyed, etc.

Figure 10:
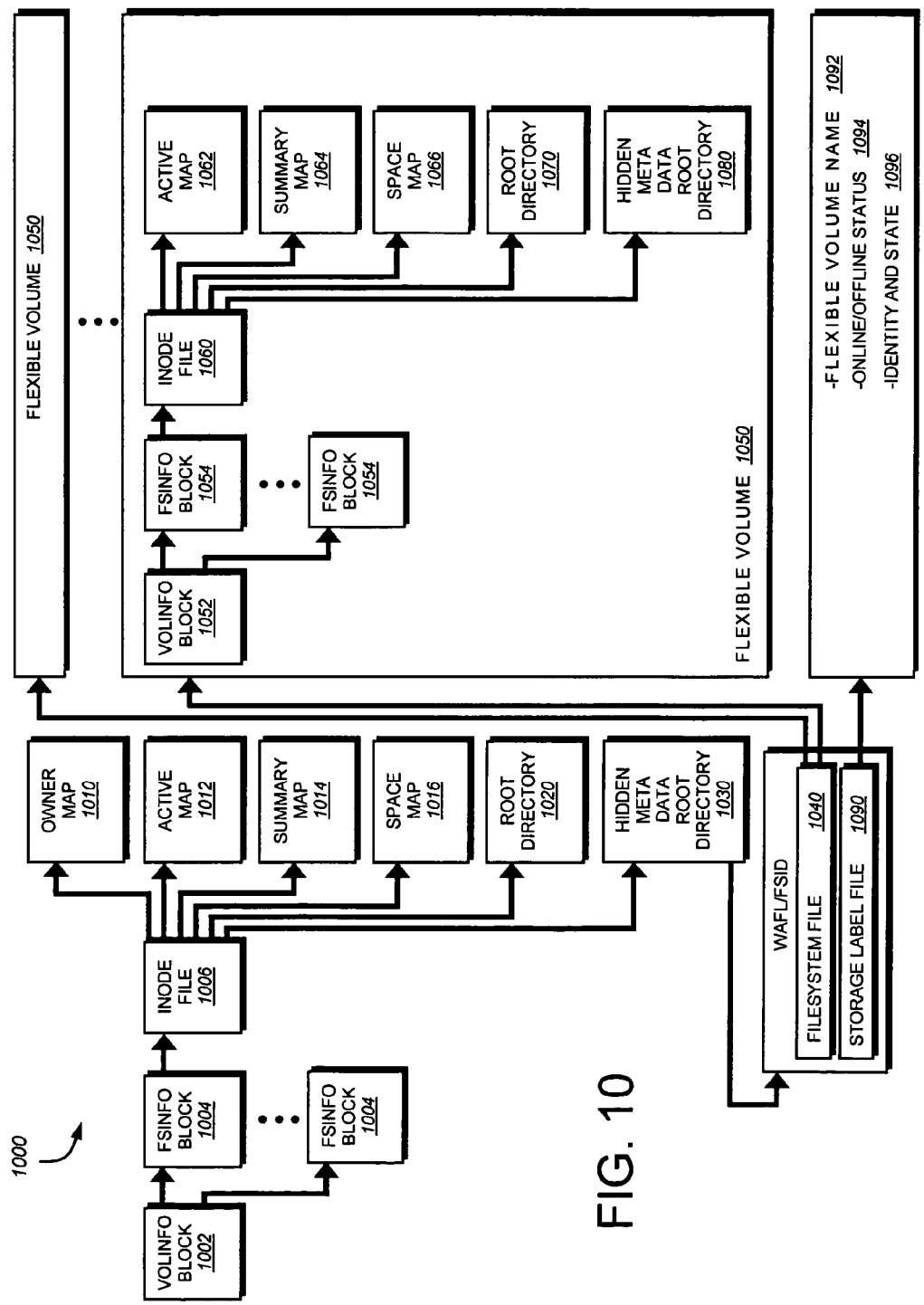
FIG. 10 is a schematic block diagram of an exemplary on-disk layout of the aggregate in accordance with an embodiment of the present invention.

FIG. 10 is a schematic block diagram of an on-disk representation of an aggregate 1000. The storage operating system 300, e.g., the RAID system 380, assembles a physical volume of pvbns to create the aggregate 1000, with pvbns 1 and 2 comprising a "physical" volinfo block 1002 for the aggregate. The volinfo block 1002 contains block pointers to fsinfo blocks 1004, each of which may represent a snapshot of the aggregate. Each fsinfo block 1004 includes a block pointer to an inode file 1006 that contains inodes of a plurality of files, including an owner map 1010, an active map 1012, a summary map 1014 and a space map 1016, as well as other special meta-data files. The inode file 1006 further includes a root directory 1020 and a "hidden" meta-data root directory 1030, the latter of which includes a namespace having files related to a flexible volume in which users cannot "see" the files. The hidden meta-data root directory includes the WAFL/fsid/directory structure that contains filesystem file 1040 and storage label file 1090. Note that root directory 1020 in the aggregate is empty; all files related to the aggregate are organized within the hidden meta-data root directory 1030.

In addition to being embodied as a container file having level 1 blocks organized as a container map, the filesystem file 1040 includes block pointers that reference various file systems embodied as flexible volumes 1050. The aggregate 1000 maintains these flexible volumes 1050 at special reserved inode numbers. Each flexible volume 1050 also has special reserved inode numbers within its flexible volume space that are used for, among other things, the block allocation bitmap structures. As noted, the block allocation bitmap structures, e.g., active map 1062, summary map 1064 and space map 1066, are located in each flexible volume.

Specifically, each flexible volume 1050 has the same inode file structure/content as the aggregate, with the exception that there is no owner map and no WAFL/fsid/filesystemfile, storage label file directory structure in a hidden meta-data root directory 1080. To that end, each flexible volume 1050 has a volinfo block 1052 that points to one or more fsinfo blocks 1054, each of which may represent a snapshot along with the active file system of the flexible volume. Each fsinfo block, in turn, points to an inode file 1060 that, as noted, has the same inode structure/content as the aggregate with the exceptions noted above. Each flexible volume 1050 has its own inode file 1060 and distinct inode space with corresponding inode numbers, as well as its own root (fsid) directory 1070 and subdirectories of files that can be exported separately from other flexible volumes.

The storage label file 1090 contained within the hidden meta-data root directory 1030 of the aggregate is a small file that functions as an analog to a conventional raid label. label. A raid label includes physical information about the storage system, such as the volume name; that information is loaded into the storage label file 1090. Illustratively, the storage label file 1090 includes the name 1092 of the associated flexible volume 1050, the online/offline status 1094 of the flexible volume, and other identity and state information 1096 of the associated flexible volume (whether it is in the process of being created or destroyed).

F. VLDB

Figure 11:
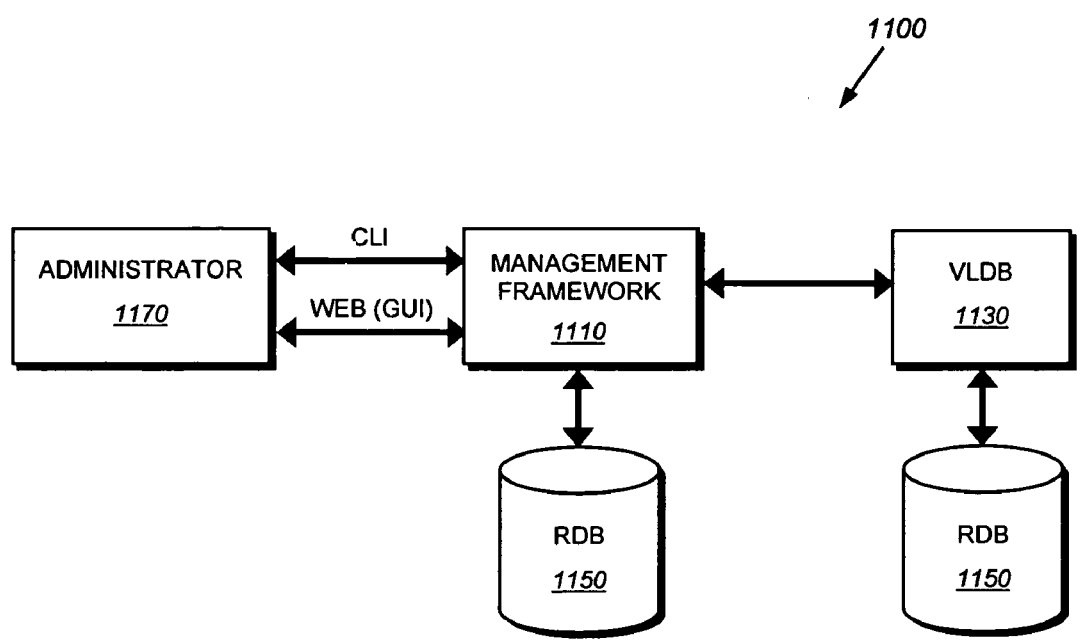
FIG. 11 is a schematic block diagram illustrating a collection of management processes in accordance with an embodiment of the present invention.

FIG. 11 is a schematic block diagram illustrating a collection of management processes that execute as user mode applications 1100 on the storage operating system 300 to provide management of configuration information (i.e. management data) for the nodes of the cluster. To that end, the management processes include a management framework process 1110 and a volume location database (VLDB) process 1130, each utilizing a data replication service (RDB 1150) linked as a library. The management framework 1110 provides an administrator 1170 with a user interface via a command line interface (CLI) and/or a web-based graphical user interface (GUI). The management framework is illustratively based on a conventional common interface model (CIM) object manager that provides the entity to which users/system administrators interact with a node 200 in order to manage the cluster 100.

The VLDB 1130 is a database process that tracks the locations of various storage components (e.g., SVSs, flexible volumes, aggregates, etc.) within the cluster 100 to thereby facilitate routing of requests throughout the cluster. In the illustrative embodiment, the N-module 310 of each node accesses a configuration table 235 that maps the SVS ID 502 of a data container handle 500 to a D-module 350 that "owns" (services) the data container within the cluster. The VLDB includes a plurality of entries which, in turn, provide the contents of entries in the configuration table 235; among other things, these VLDB entries keep track of the locations of the flexible volumes (hereinafter generally "volumes 910") and aggregates 900 within the cluster. Examples of such VLDB entries include a VLDB volume entry 1200 and a VLDB aggregate entry 1300.

Figure 12:
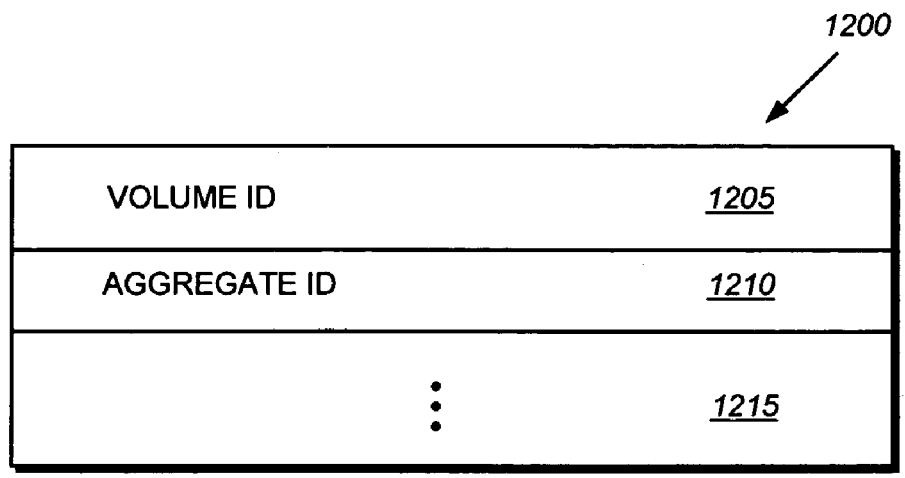
FIG. 12 is a schematic block diagram of a volume location database (VLDB) volume entry in accordance with an embodiment of the present invention.

FIG. 12 is a schematic block diagram of an exemplary VLDB volume entry 1200.

Figure 13:
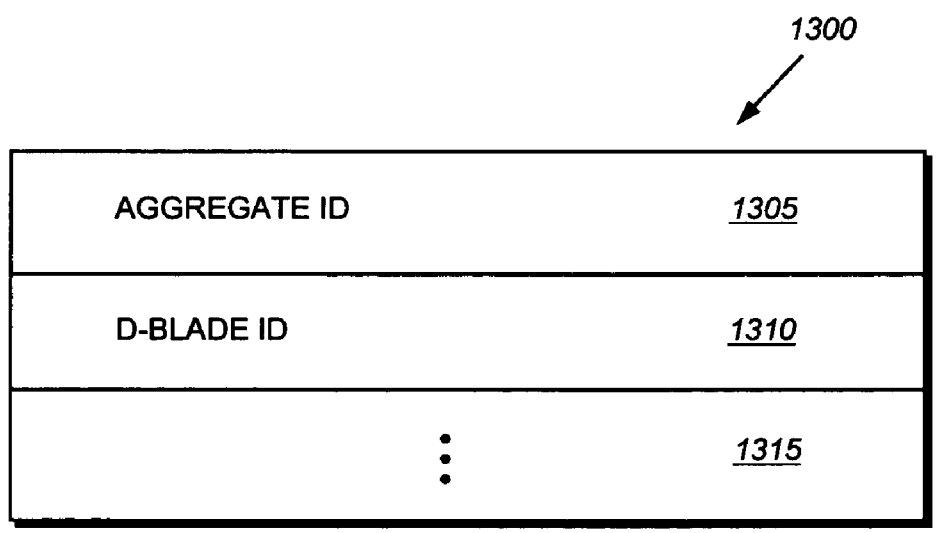
FIG. 13 is a schematic block diagram of a VLDB aggregate entry in accordance with an embodiment of the present invention.

The entry 1200 includes a volume ID field 1205, an aggregate ID field 1210 and, in alternate embodiments, additional fields 1215. The volume ID field 1205 contains an ID that identifies a volume 910 used in a volume location process. The aggregate ID field 1210 identifies the aggregate 900 containing the volume identified by the volume ID field 1205. Likewise, FIG. 13 is a schematic block diagram of an exemplary VLDB aggregate entry 1300. The entry 1300 includes an aggregate ID field 1305, a D-module ID field 1310 and, in alternate embodiments, additional fields 1315. The aggregate ID field 1305 contains an ID of a particular aggregate 900 in the cluster 100. The D-module ID field 1310 contains an ID of the D-module hosting the particular aggregate identified by the aggregate ID field 1305.

The VLDB illustratively implements a RPC interface, e.g., a Sun RPC interface, which allows the N-module 310 to query the VLDB 1130. When encountering contents of a data container handle 500 that are not stored in its configuration table, the N-module sends an RPC to the VLDB process. In response, the VLDB 1130 returns to the N-module the appropriate mapping information, including an ID of the D-module that owns the data container. The N-module caches the information in its configuration table 235 and uses the D-module ID to forward the incoming request to the appropriate data container. All functions and interactions between the N-module 310 and D-module 350 are coordinated on a cluster-wide basis through the collection of management processes and the RDB library user mode applications 1100.

To that end, the management processes have interfaces to (are closely coupled to) RDB 1150. The RDB comprises a library that provides a persistent object store (storing of objects) for the management data processed by the management processes. Notably, the RDB 1150 replicates and synchronizes the management data object store access across all nodes 200 of the cluster 100 to thereby ensure that the RDB database image is identical on all of the nodes 200. At system startup, each node 200 records the status/state of its interfaces and IP addresses (those IP addresses it "owns") into the RDB database.

G. Storage System Architecture

The present invention is illustratively implemented on a storage system architecture comprising two or more volumes 910 distributed across a plurality of nodes 200 of cluster 100. The volumes are organized as a SVS and configured to store content of data containers, such as files and luns, served by the cluster in response to multi-protocol data access requests issued by clients 180. Notably, the content of each data container is apportioned among the volumes of the SVS to thereby improve the efficiency of storage service provided by the cluster. To facilitate a description and understanding of the present invention, data containers are hereinafter referred to generally as "files".

The SVS comprises a meta-data volume (MDV) and one or more data volumes (DV). The MDV is configured to store a canonical copy of certain meta-data, including access control lists (ACLs) and directories, associated with all files stored on the SVS, whereas each DV is configured to store, at least, data content of those files. For each file stored on the SVS, one volume is designated the container attribute volume (CAV) and, to that end, is configured to store ("cache") certain, rapidly-changing attribute meta-data, including time stamps and file length, associated with that file to thereby offload access requests that would otherwise be directed to the MDV.

In the illustrative embodiment described herein, determination of the CAV for a file is based on a simple rule: designate the volume holding the first stripe of content (data) for the file as the CAV for the file. Not only is this simple rule convenient, but it also provides an optimization for small files. That is, a CAV may be able to perform certain operations without having to communicate with other volumes of the SVS if the file is small enough to fit within the specified stripe width. Ideally, the first stripes of data for files are distributed among the DVs of the SVS to thereby facilitate even distribution of CAV designations among the volumes of the SVS. In alternate embodiments, data for files is striped across the MDV and the DVs.

Figure 14:
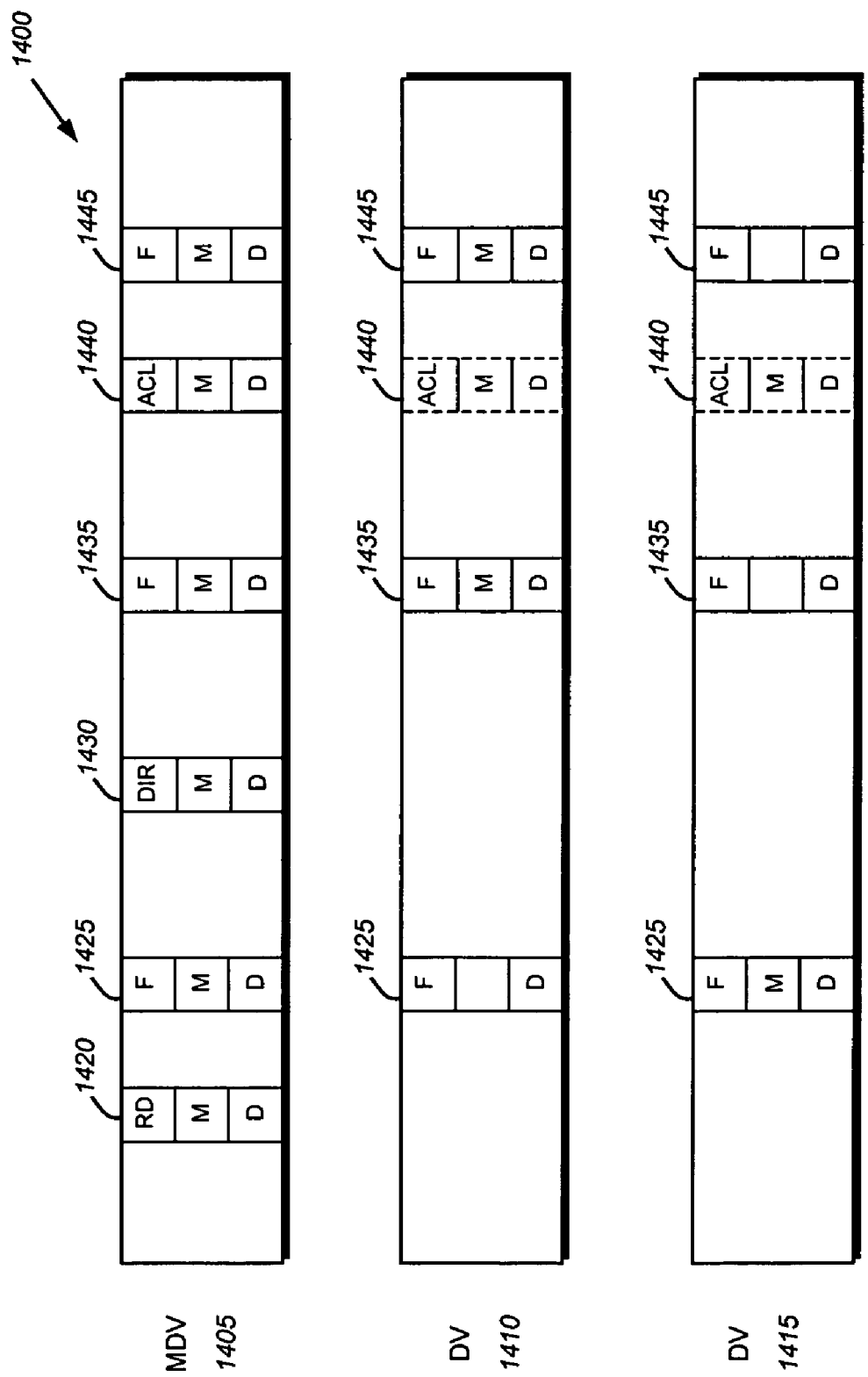
FIG. 14 is a schematic block diagram of a striped volume set (SVS) in accordance with an embodiment of the present invention.

FIG. 14 is a schematic block diagram of the inode files of an SVS 1400 in accordance with an embodiment of the present invention. The SVS 1400 illustratively comprises three volumes, namely MDV 1405 and two DVs 1410, 1415. It should be noted that in alternate embodiments additional and/or differing numbers of volumes may be utilized in accordance with the present invention. Illustratively, the MDV 1405 stores a plurality of inodes, including a root directory (RD) inode 1420, a directory (DIR) inode 1430, file (F) inodes 1425, 1435, 1445 and an ACL inode 1440. Each of these inodes illustratively includes meta-data (M) associated with the inode. In the illustrative embodiment, each inode on the MDV 1405 does not include data (D); however, in alternate embodiments, the MDV may include user data.

In contrast, each DV 1410, 1415 stores only file (F) inodes 1425, 1435, 1445 and ACL inode 1440. According to the inventive architecture, a DV does not store directories or other device inodes/constructs, such as symbolic links; however, each DV does store F inodes, and may store cached copies of ACL inodes, that are arranged in the same locations as their respective inodes in the MDV 1405. A particular DV may not store a copy of an inode until an I/O request for the data container associated with the inode is received by the D-module serving a particular DV. Moreover, the contents of the files denoted by these F inodes are periodically sparse according to SVS striping rules, as described further herein. In addition, since one volume is designated the CAV for each file stored on the SVS 1400, DV 1415 is designated the CAV for the file represented by inode 1425 and DV 1410 is the CAV for the files identified by inodes 1435, 1445. Accordingly, these CAVs cache certain, rapidly-changing attribute meta-data (M) associated with those files such as, e.g., file size 615, as well as access and/or modification time (mtime) stamps 620.

Figure 15:
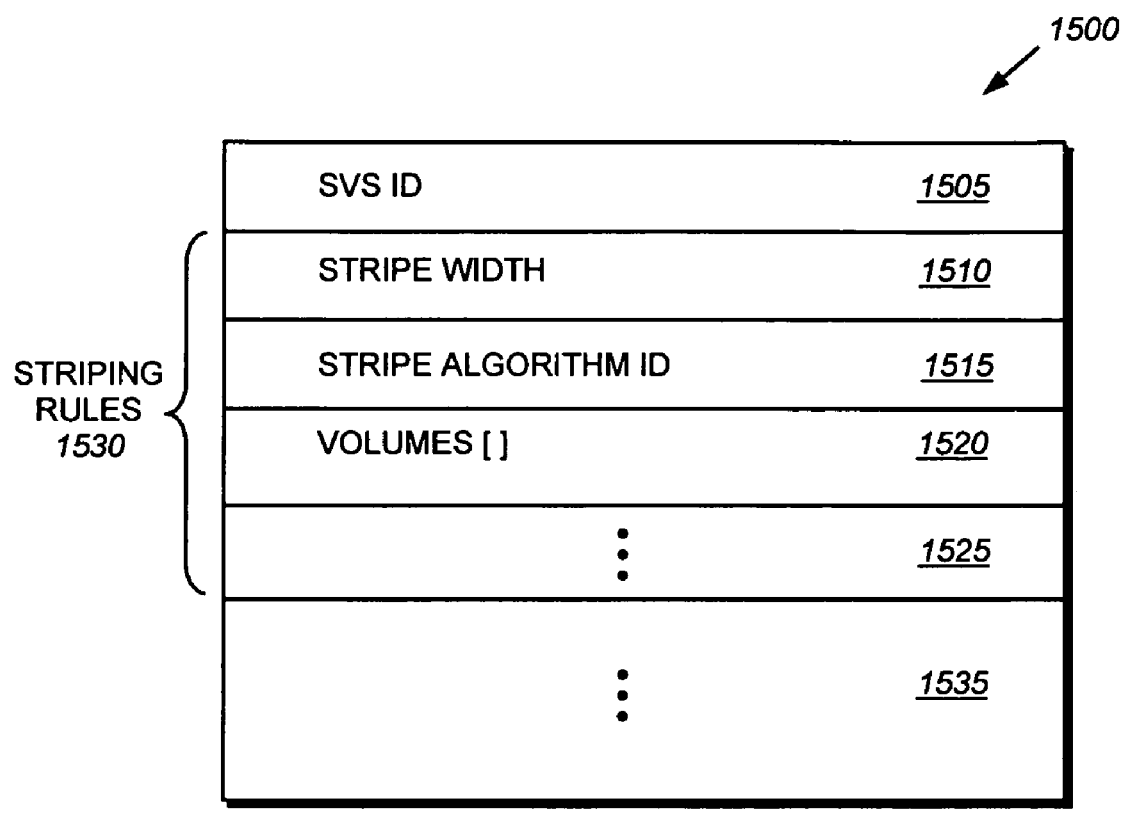
FIG. 15 is a schematic block diagram of a VLDB SVS entry in accordance with an embodiment the present invention.

The SVS is associated with a set of striping rules that define a stripe algorithm, a stripe width and an ordered list of volumes within the SVS. The striping rules for each SVS are illustratively stored as an entry of VLDB 1130 and accessed by SVS ID. FIG. 15 is a schematic block diagram of an exemplary VLDB SVS entry 1500 in accordance with an embodiment of the present invention. The VLDB entry 1500 includes a SVS ID field 1505 and one or more sets of striping rules 1530. In alternate embodiments additional fields 1535 may be included. The SVS ID field 1505 contains the ID of a SVS which, in operation, is specified in data container handle 500.

Each set of striping rules 1530 illustratively includes a stripe width field 1510, a stripe algorithm ID field 1515, an ordered list of volumes field 1520 and, in alternate embodiments, additional fields 1525. The striping rules 1530 contain information for identifying the organization of a SVS. For example, the stripe algorithm ID field 1515 identifies a striping algorithm used with the SVS. In the illustrative embodiment, multiple striping algorithms could be used with a SVS; accordingly, stripe algorithm ID is needed to identify which particular algorithm is utilized. Each striping algorithm, in turn, specifies the manner in which file content is apportioned as stripes across the plurality of volumes of the SVS. The stripe width field 1510 specifies the size/width of each stripe. The ordered list of volumes field 1520 contains the IDs of the volumes comprising the SVS. Moreover, the ordered list of volumes may specify the function and implementation of the various volumes and striping rules of the SVS. For example, the first volume in the ordered list may denote the MDV of the SVS, whereas the ordering of volumes in the list may denote the manner of implementing a particular striping algorithm, e.g., round-robin.

A Locate( ) function 375 is provided that enables the VSM 370 and other modules (such as those of N-module 310) to locate a D-module 350 and its associated volume of a SVS 1400 in order to service an access request to a file. The Locate( ) function takes as arguments, at least (i) a SVS ID 1505, (ii) an offset within the file, (iii) the inode number for the file and (iv) a set of striping rules 1530, and returns the volume 910 on which that offset begins within the SVS 1400. For example, assume a data access request directed to a file is issued by a client 180 and received at the N-module 310 of a node 200, where it is parsed through the multi-protocol engine 325 to the appropriate protocol server of N-module 310. To determine the location of a D-module 350 to which to transmit a CF message 400, the N-module 310 may first retrieve a SVS entry 1500 to acquire the striping rules 1530 (and list of volumes 1520) associated with the SVS. The N-module 310 then executes the Locate( ) function 375 to identify the appropriate volume to which to direct an operation. Thereafter, the N-module may retrieve the appropriate VLDB volume entry 1200 to identify the aggregate containing the volume and the appropriate VLDB aggregate entry 1300 to ultimately identify the appropriate D-module 350. The protocol server of N-module 310 then transmits the CF message 400 to the D-module 350.

H. Data Access Operation Ordering

Broadly stated, if a client requires ordering of data access operations issued to the nodes 200 of cluster 100, it is the responsibility of that client to ensure such ordering. For example, if the client 180 issues a plurality of operations directed to a region of a file or if two clients simultaneously attempt to modify the same region of the file, the ordering of those operations is not guaranteed unless the client waits for a round-trip of each operation to complete. In this context, a round trip denotes communication (e.g., a "ping") from the N-module 310 to the D-module 350 indicating the region (buffer) of the file that the N-module would like to service in response to the operation issued by the client. However, once ordering is established, the file system 360 ensures that each operation in that established order is treated atomically. The round trip ensures that the N-module has a valid cache of data by quickly validating the content of that cache, while maintaining file system control over the coherency of the data in the file.

Specifically, the architecture of the file system 360 illustratively provides coherency control that imposes order on read and write operations for a file with respect to each other. Write operations occur during modified phases of the file system and read operations occur between these phases. Coherency ordering is achieved by serializing the operations such that only one operation is allowed to be in a modify phase at a time. In fact, an invariant of the illustrative (WAFL) file system 360 is that it serializes the effects of all read and write operations to a file. Execution of a write operation is atomic and execution of a read operation reflects either all or none of the results of that write operation. Thus, an ordering sequence internal to the node is established at the file system layer 360 of the storage operating system 300.

Figure 16:
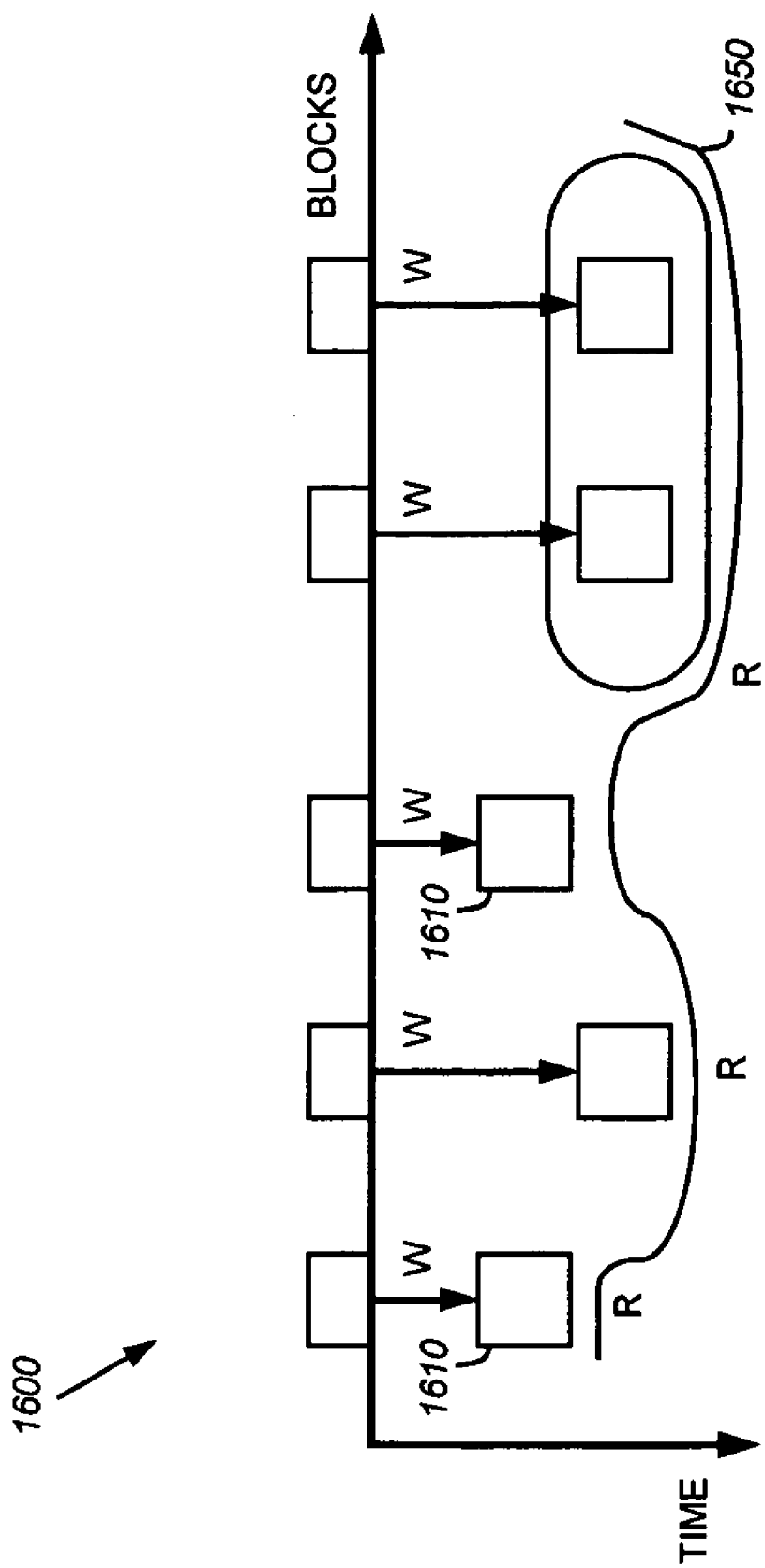
FIG. 16 is a diagram illustrating data buffers or blocks of a file arrayed in file space over time.

The illustrative file system maintains such coherency control through the use of file system images representing the state of a file. FIG. 16 is a diagram illustrating data buffers or blocks 1610 of a file arrayed in file space over time. At various times, some blocks are modified via write operations (W) and the diagram indicates the point in time at which these blocks are valid. Some modifications are coupled together (circled) in the same write operation and are treated atomically, while other modifications are performed either by different nodes or by the same node at different times. Read operations (R) may occur anywhere in the file at any time, although the file system prevents a read operation from "crossing" (executing during) an atomically coupled write operation. Thus, from the perspective of an N-module 310, the state of the file system at any time appears as an advancing wavefront 1650. The illustrative file system 360 guarantees that when scheduling a message received from an N-module to validate its buffer, the response to the N-module will reflect a valid state of the file. The advancing wavefront 1650 represents a simple synchronization mechanism for ensuring a valid file system state.

According to the illustrative distributed storage system architecture, an N-module 310 that receives a client request directed to a file initially attempts to serve that request from its local cache 240. However, the N-module does not necessarily know whether its local cache is up-to-date because there may be activity at another N-module of the cluster 100 that, e.g., is also writing to that same file. Write requests are "pushed through" (written) to the D-module 350, whereas read requests are attempted to be serviced first from the local N-module cache or, alternatively, at the appropriate D-module.

I. Lightweight Coherency Control Protocol

The present invention is directed to a system and method for ensuring that a copy of a region of file data (i.e., a data buffer) stored in a local cache 240 of an N-module 310 is up-to-date with respect to the authoritative copy of that data served by the D-module 350. More specifically, the present invention is directed to a lightweight coherency control protocol that ensures consistency of data containers, such as files, and associated data buffers stored on one or more volumes served by a plurality of nodes, e.g., storage systems, connected as a cluster. Each file is illustratively identified by a file identifier (file ID) and each data buffer is represented by a file block number (fbn) that identifies the position or offset of the buffer within the file.

According to an aspect of the invention, each buffer is associated with a current cache sequence number comprising a load generation value and an update count value. The load generation value is incremented every time an inode 802 (FIG. 8) is loaded from disk 130 into memory 224, i.e., buffer cache 250, of D-module 350. Once the inode 802 for a file, such as file 800, is loaded and its load generation value is set, then the appropriate buffer (e.g., data block 806) of a buffer tree for the file is loaded into the memory. The update count value is incremented each time the buffer 806 is updated with a write request/operation. Therefore, each buffer 806 loaded into the buffer cache 250 of memory 224 is tagged with the load generation value and an update count from the time that buffer is loaded.

Figure 17:
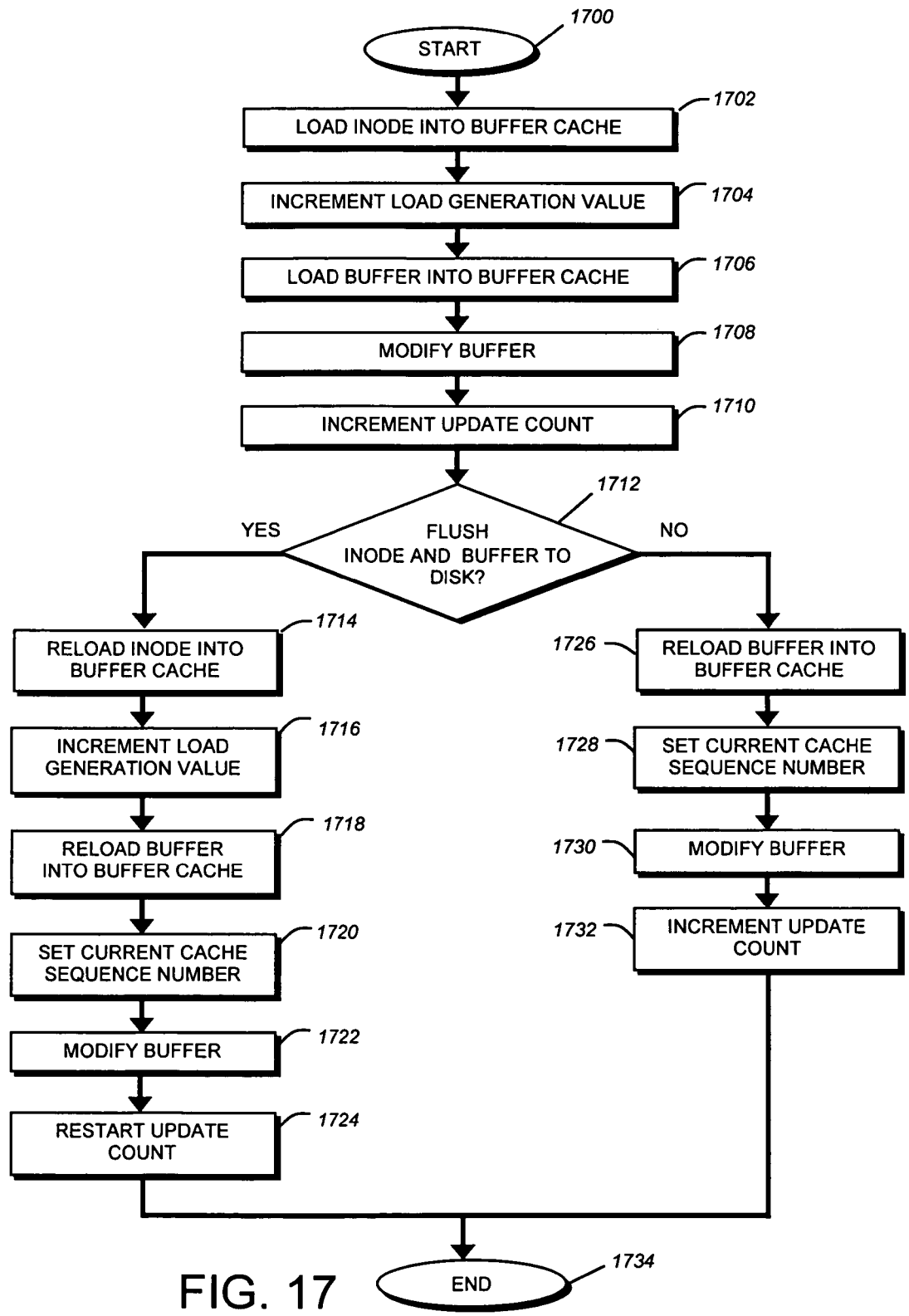
FIG. 17 is a flowchart illustrating an aspect of the lightweight coherency control protocol procedure in accordance with the present invention.

FIG. 17 is a flowchart illustrating an aspect of the lightweight coherency control protocol procedure in accordance with the present invention. The procedure starts at Step 1700 and proceeds to Step 1702 where an inode for a file is initially loaded into memory (buffer cache). In Step 1704, the load generation value is incremented, e.g., to "1", and, in Step 1706, a buffer is loaded into the buffer cache. In Step 1708, a modification is made to the buffer and the update count is also incremented, e.g., to "1" (Step 1710). In Step 1712, a determination is made as to whether the inode and buffer are then "flushed" (unloaded) from D-module memory and written to disk. Note that unloading of the inode for a file from the buffer cache of the D-module effectively invalidates all local caches of all N-modules, i.e., all of the inode's buffers are freed-up from memory and their update counts are zeroed. If both the inode and buffer are flushed to disk, then the next time that the inode is reloaded into the buffer cache from disk (Step 1714), the load generation number is again incremented, e.g., to "2", in Step 1716. Thereafter, when the buffer is subsequently reloaded into memory in Step 1718, its current cache sequence number (equal to the concatenation of the load generation value and the update count) is set in Step 1720. In Step 1722, a modification is made to the buffer and its update count re-starts (e.g, at zero) for this next generation in Step 1724. The procedure then ends at Step 1734.

However, if only the buffer is flushed to disk and the inode remains resident in the buffer cache, then the next time the buffer is reloaded into the buffer cache from disk (Step 1726), its current cache sequence number is set in Step 1728. In Step 1730, a modification is made to the buffer and the update count is incremented, e.g., to "2" (Step 1732). According to the invention, the update count advances for every buffer whenever it is modified, even if that buffer is freed-up from memory and subsequently loaded from disk, as long as its inode remains loaded in memory. Moreover, if the inode remains resident (loaded) in memory, the load generation number for that inode does not change (even if buffers of its buffer tree are being loaded, modified, written to disk and unloaded). In that case, only the update count for each affected buffer changes. Thus, the load generation number only changes when the inode itself is unloaded and then loaded again. The procedure then ends at Step 1734.

Figure 18:
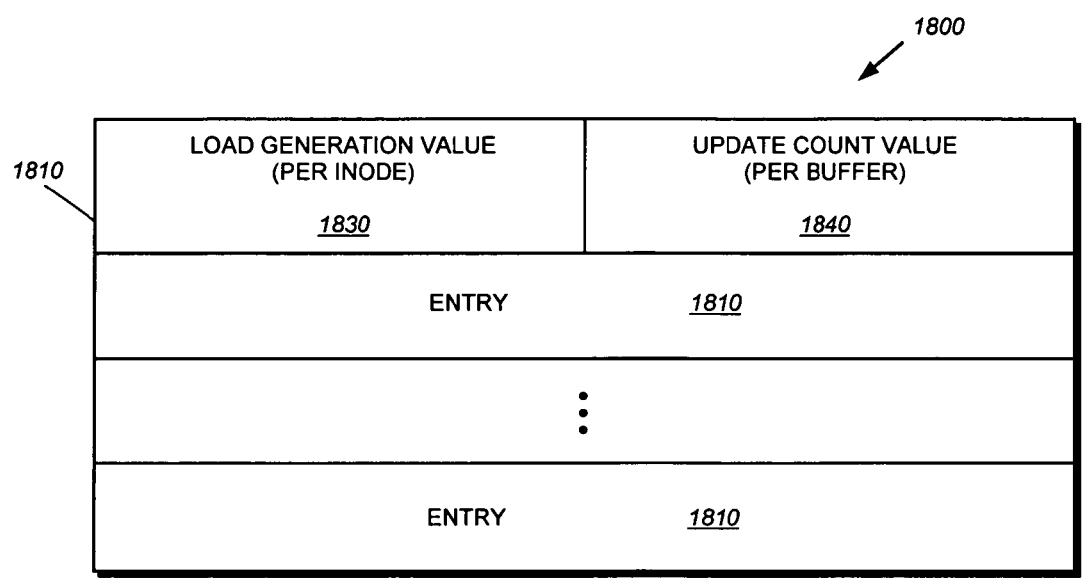
FIG. 18 is a schematic block diagram of a cache table that may be advantageously used with the present invention.

In the illustrative embodiment, inode 802 (described in reference to inode 600, FIG. 6) is extended to include a load generation field (such as load generation field 635) that contains the load generation value. In addition, the file system 360 on D-module 350 maintains a data structure, illustratively embodied as a cache list or table stored in buffer cache 250 of memory 224, which is configured to hold the current cache sequence number of the present invention. FIG. 18 is a schematic block diagram of a cache table 1800 is that may be advantageously used with the present invention. The cache table 1800 has one or more entries 1810, each containing a current cache sequence number comprising a load generation value 1830 and an update count value 1840 for the buffers 806 of its responsible files or file regions. The cache table 1800 can be implemented either has a hash table (indexed by fbn) or a sparse table containing one value per possible buffer 806 that may be loaded in memory.

Illustratively, the file system 360 on the D-module 350 combines the load generation value 1830 and update count value 1840 to form the current cache sequence number for the data buffer 806. That is, for the duration of each inode 802 loaded into memory, the file system 360 maintains the update count value 1840 for each buffer 806 that has also been loaded in memory. Note that the local cache 240 on the N-module 310 is valid only as long as the inode 802 is resident in memory. The contents of the data buffers 806 can be deleted ("flushed") from the cache 240 and stored ("pushed back") to disk 130 as long as the file system 360 on the D-module 350 keeps track of the update counts in case the buffers are thereafter loaded again.

Broadly stated, in response to receiving the data access (read) request from a client that is directed to a file, an N-module forwards a message to the appropriate D-module to validate the particular file and data buffer that the N-module attempts to serve. The D-module retrieves the inode of the requested file and determines whether the data buffer is cached at the N-module and, if so, whether that cached copy is representative of the most recent version of the data buffer (as denoted by a current cache sequence number). If the copy of the data buffer cached at the N-module represents the most recent version of the buffer, the D-module returns a response to the N-module indicating that the cached buffer can be used to service the read request. Otherwise, the D-module returns (i) a copy of the updated data buffer to the N-module as part of the response or (ii) a response indicating that the cached buffer is "stale". In the latter case, the N-module then forwards a message to the D-module requesting the updated data buffer.

In accordance with another aspect of the invention, modified ("dirty") buffers stored in the local cache 240 of the N-module do not have to be revoked, unlike a typical cluster file system. That is, the dirty buffers do not have to be invalidated synchronously because other N-modules 310 may not request the buffers and, even if one does, that N-module must validate the request directed to the buffer. Thus, the inventive technique enables an N-module to provide "as needed" validation of a requested buffer 806 back to the D-module 350 that serves ("owns") that region of the file. Validation is generally fast, thereby facilitating servicing of the request from the N-module cache.

In response to a message from an N-module to validate a cached data buffer 806 for a particular file 800, the D-module 350 responds with the proper version(s) of the data buffer(s) needed to service the request. The D-module effectively schedules the request (e.g., a read operation), examines the affected buffer and determines the proper version of that buffer. The D-module (or, more specifically, the file system 360) then responds to the N-module with proper load generation value 1830 and update count value 1840 for the buffer (i.e., the proper update count and load generation value after inode for the file is loaded).

In the illustrative embodiment, the invention may be implemented such that the N-module 310 provides the D-module 350 with an indication of the interested data buffers 806 (regions of a file) and the D-module responds with the proper versions needed. The N-module can then determine if it has the proper versions and, if not, request those buffers that are not updated. Alternatively, the N-module/D-module exchange can be reduced to a single round trip wherein the N-module provides an indication of the buffers and versions of the buffers in its cache 240 for the file. The D-module 350 then determines whether those cached buffers are stale and, if so, responds with proper version of that data. For those cached buffers that are current, the D-module merely responds with an acknowledgement that the buffers are up-to-date.

Figure 19A:
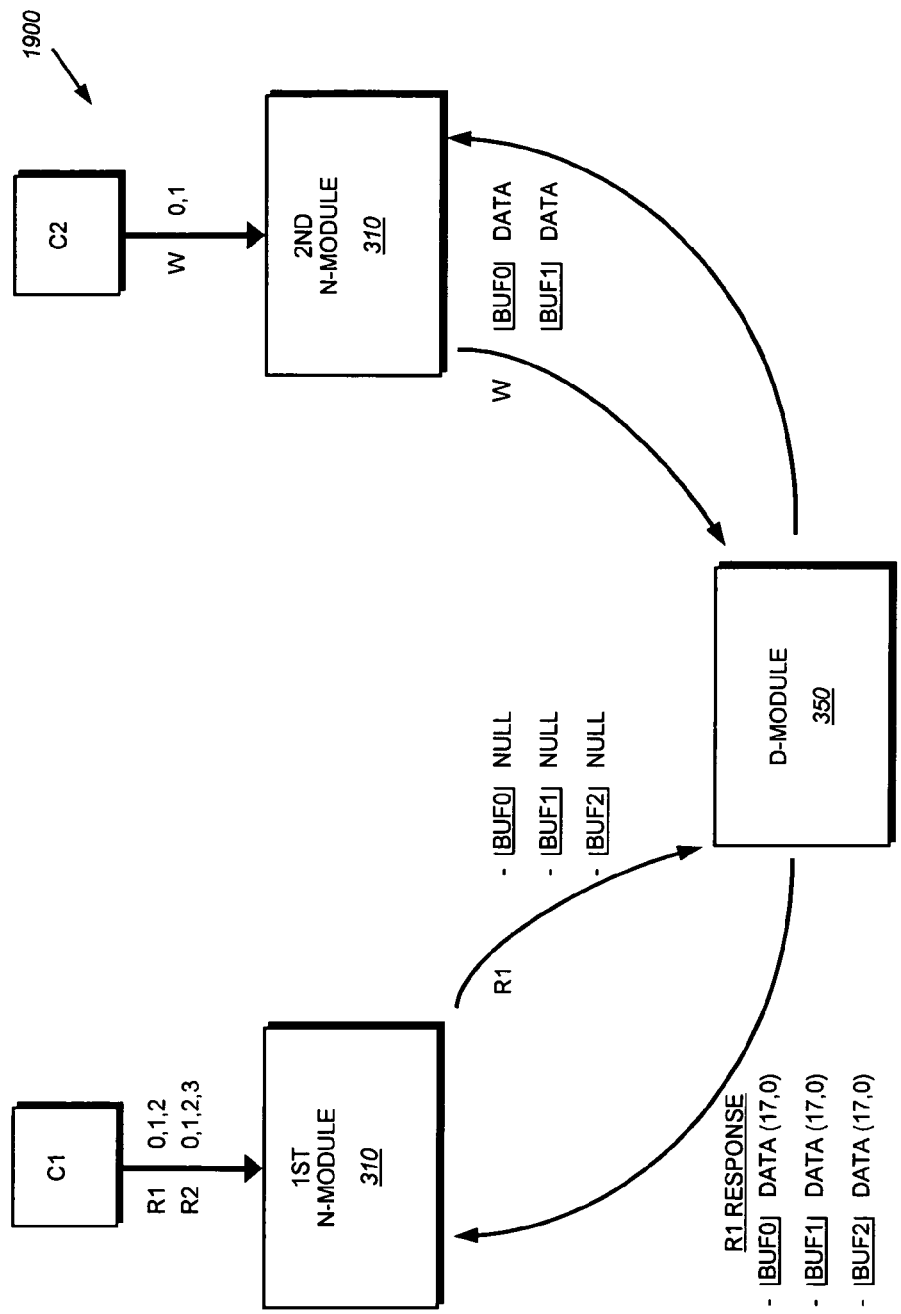
FIGS. 19A, 19B are schematic block diagrams illustrating operation of a light-weight coherency control protocol for a clustered storage system in accordance with the present invention.
Figure 19B:
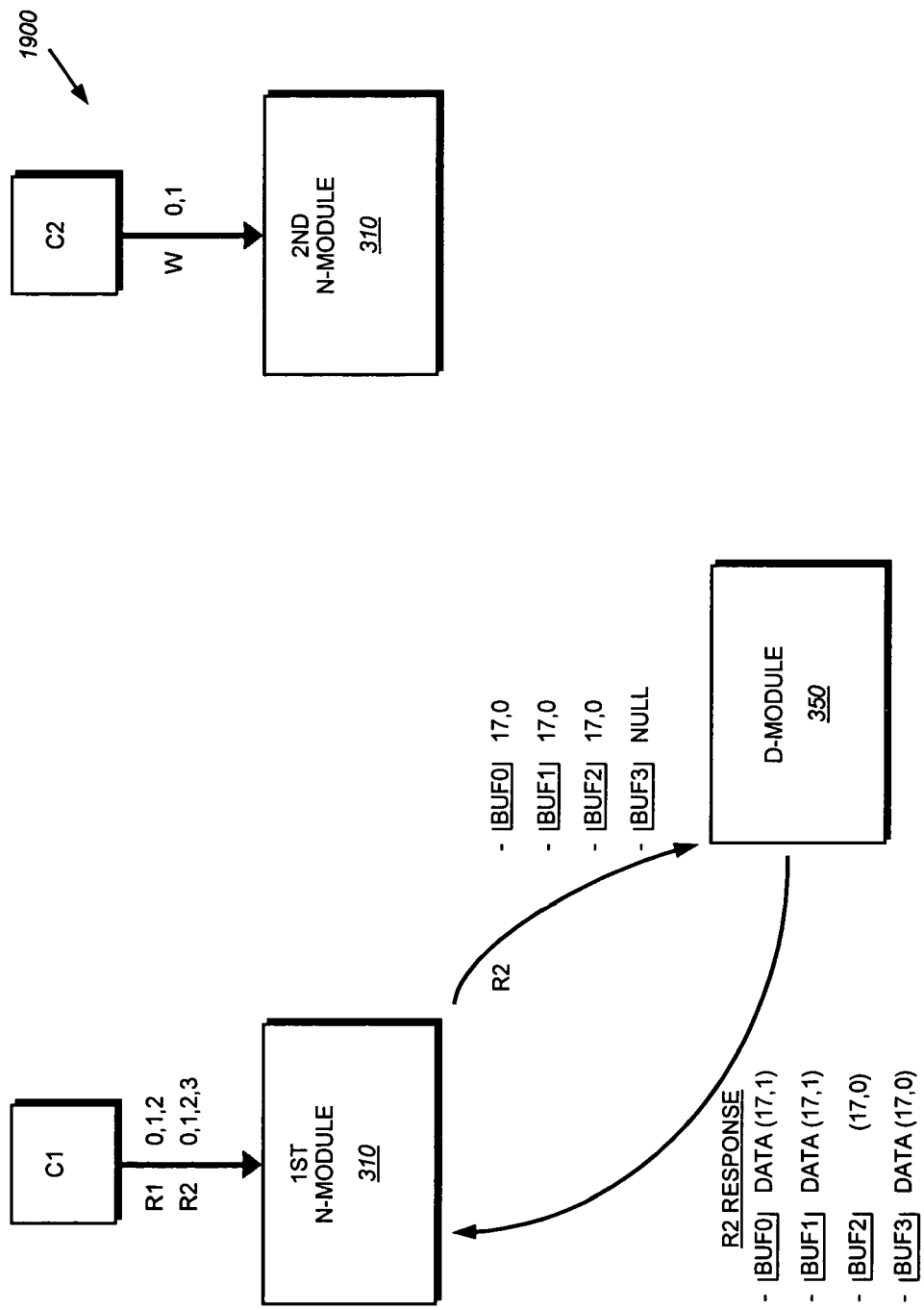

FIGS. 19A, 19B are schematic block diagrams illustrating operation of the lightweight coherency control protocol for a clustered storage system in accordance with the present invention. For ease of depiction and description, cluster 1900 comprises two N-modules 310 in communicating relation with a D-module 350 configured to service particular buffers 806 of a file 800. A first client C1 issues a first read request (operation) R1 to a first N-module, wherein the first read request R1 is directed to blocks (buffers) 0, 1, 2 of a file. A second client C2 then issues a write request (operation) W to a second N-module, wherein the write request is directed to the buffers 0, 1 of the same file. The first client C1 thereafter issues a second read request R2 to the first N-module, wherein the second read request R2 is directed to buffers 0, 1, 2, 3 of the same file.

Refer to FIG. 19A. In response to receiving the first read request R1, the first N-module examines its local cache 240 and determines that the requested buffers 806 are not stored therein. The first N-module thus sends a CF message 400 to the D-module in order to service the request. Illustratively, the CF protocol layer 410 of the message 400 includes a file ID 412 (FIG. 4) along with an fbn 414 and current cache sequence number for each requested buffer 806, e.g., buf0-buf2. It should be noted that the arrangement of file ID 412 with fbn 414 and current cache sequence number is illustrative only and other messaging arrangements containing other information may also be used with the invention.

The D-module 350 loads the inode 802 for the file 800 (if it is not already loaded) into the buffer cache 250 and sets the load generation value 1830 (e.g., 17) by incrementing a previous value (e.g., 16) stored in the load generation field 635 of the inode. The D-module then loads the requested buffers 806 (if they are not already loaded), constructing only that portion of the buffer tree for the file 800 as needed. Illustratively, the update count value 1840 for each requested buffer, e.g., buf0, buf1, buf2, equals zero. The D-module then responds to the N-module 310 by returning a CF message 400 containing the requested data (buf0-buf2) along with their current cache sequence numbers, e.g., buf0 data (17,0), buf1 data (17,0) and buf2 data (17,0). The first N-module thereafter returns the requested data to the client C1.

In response to receiving the write request, the second N-module forwards the request to the D-module 350, which services the write request to buf0 and buf1. To that end, the D-module modifies the data for buf0, buf1 and stores the modified buffers to disk 130. Notably, the D-module does not increment the load generation value 1830 since the inode 802 is already loaded into memory; as a result, the load generation value remains the same (e.g., 17). However, since buf0 and buf1 have been modified with data, the D-module (file system 360) increments the update count values 1840 to, e.g., one for those buffers. The D-module may then return modified buffer sequence numbers to the N-module 310; in any event, the D-module acknowledges completion of the modification to the N-module which, in turn, acknowledges the write request to the client C2.

Refer now to FIG. 19B. The second read request is then received at the first N-module, which sends a message 400 to the D-module to validate the file and data buffers cached at the N-module. Again, the CF message 400 includes the file ID 412 as well as the fbn 414 and current cache sequence number for each requested buffer, e.g., buf0 (17,0), buf1 (17,0), buf2 (17,0) and buf3 (null). According to the invention, if the copy of the buffer cached at the N-module represents the most recent version of the data for that buffer, the D-module returns a response to the N-module indicating that the cached buffer can be used to service the read request. Otherwise, the D-module returns a copy of the updated data buffer to the N-module with the current cache sequence number for the buffer 806. Therefore, the response from the D-module to the first N-module illustratively comprises buf0 data (17,1), buf1 data (17,1) buf2 (17,0) and buf3 data (17,0). Note that since the first N-module has the most recent version of the data for buf2, only the fbn and current cache sequence number (and no data) are returned for that buffer.

Advantageously, the inventive coherency control protocol does not require the use of distributed locking, such as range locks, as commonly used with distributed multi-storage system architectures. The illustrative file system 360 inherently serializes operations directed to an inode and the inventive coherency control protocol exploits that inherent function by serializing incoming operation requests in one place, i.e., at the D-module (file system) servicing that inode (or at least the region of the file represented by that inode).

While there has been shown and described an illustrative embodiment of a novel lightweight coherency control protocol for ensuring the consistency of data containers stored on one or more volumes served by a plurality of storage systems connected as a cluster, it is to be understood that various other adaptations and modifications may be made within the spirit and scope of the invention. For example, in an alternate embodiment of the invention, the contents of the cache table 1800 can be stored in the buffer tree of a file 800, since each buffer tree has buffer descriptors (not shown) that contain information about each of the buffers 806. Specifically, the buffer tree in memory (buffer cache 250) comprises buffer descriptors for indirect blocks 804 that eventually point to buffer descriptors for the data buffers (data blocks 806). Each of the latter buffer descriptors for the data blocks points to an appropriate 4 kB "page" or data buffer 806 containing the actual data.

According to this alternate embodiment of the invention, a current cache sequence number field may added to each buffer descriptor, while the load generation value is "inherited" from the inode 802 of the file 800. Thus, the in-memory inode has a field 635 that holds the new load generation value 1830 and each in-memory buffer descriptor of a data buffer 806 may be extended to include a field that holds the current update count value 1840. Each time a buffer 806 is retrieved, the N-module 310 combines the load generation value 1830 and update count value 1840 to form the current cache sequence number for the data buffer 806. Thus, the current cache sequence numbers (and, in particular, the update count values) can be stored in either the buffer descriptors or in the separate cache table 1700.

For the embodiment wherein one round trip (between the N-module and D-module) indicates the most up-to-date cache sequence number needed to serve the request and another round trip fetches the required data buffers 806, the separate cache table 1800 may be employed because it can be accessed very quickly and contains all the cache sequence numbers for each buffer 806 resident in memory 224. However, for the embodiment that uses only one round trip to validate and, if necessary, provide the requested data buffer, the buffer tree for the file must be accessed to service the request so it is efficient to also access the buffer descriptors to obtain the required values. Therefore, the cache table is not required for that embodiment.

Note that when a data buffer is flushed to disk and invalidated from the buffer cache, its buffer descriptor, which had been used to keep track of the update count on that buffer, is also invalidated and, thus, the tracking information is lost. Accordingly, the cache table is illustratively maintained in buffer cache to hold update counts for buffers that have been unloaded from memory. In response to subsequently loading a buffer for a file, this table may be accessed to determine whether the buffer was unloaded previously during the time the inode remained loaded (stayed) in memory.

The foregoing description has been directed to particular embodiments of this invention. It will be apparent, however, that other variations and modifications may be made to the described embodiments, with the attainment of some or all of their advantages. Specifically, while this description has been written in terms of N and D-modules, the teachings of the present invention are equally suitable to systems where the functionality of the N and D-modules are implemented in a single system. Alternately, the functions of the N and D-modules may be distributed among any number of separate systems, wherein each system performs one or more of the functions. Additionally, the procedures, processes and/or modules described herein may be implemented in hardware, software, embodied as a computer-readable medium having program instructions, firm-ware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for ensuring consistency of data containers and associated data buffers stored on one or more volumes served by a plurality of nodes connected as a cluster, comprising:
   tagging each data buffer of each data container with a current cache sequence number comprising a load generation value and an update count value;
   incrementing the load generation value every time an inode of a data container is loaded into a memory of a node;
   loading a data buffer of the data container into the memory; and
   incrementing the update count value of the data buffer each time the buffer is modified as long as its inode remains loaded in memory.

2. The method of claim 1 wherein each node comprises a disk element adapted to service the one or more volumes of the cluster and a network element adapted to redirect a data access request for a data container to any disk element of the cluster.

3. The method of claim 2 further comprising the step of maintaining an authoritative version of the data container and associated data buffer at the disk element.

4. The method of claim 3 further comprising the step of caching a version of the data buffer at the network element.

5. The method of claim 4 further comprising:
   receiving a data access request from a client directed to the data container at the network element;
   forwarding a first message to the appropriate disk element to validate the data buffer cached at the network element;
   determining whether the data buffer cached at the network element is representative of a most recent version of the data buffer; and
   if so, returning a response to the network element indicating that the cached buffer can be used to service the request.

6. The method of claim 5 wherein the step of determining further comprises the step of using the current cache sequence number to determine whether the data buffer cached at the network element is representative of a most recent version of the data buffer.

7. The method of claim 5 further comprising one of the steps of, if the data buffer cached at the network element is not representative of a most recent version of the data buffer:
   returning a copy of the updated data buffer to the network element as part of the response from the disk element; and
   returning the response indicating that the cached buffer is stale.

8. The method of claim 7 wherein the step of returning the response indicating that the cached buffer is stale comprises the step of forwarding a second message from the network element to the disk element requesting the updated data buffer.

9. A system configured to ensure consistency of data containers and associated data buffers stored on one or more volumes served by a plurality of nodes connected as a cluster, they system comprising:
   a disk element of a node adapted to service the one or more volumes of the cluster, the disk element further adapted to maintain an authoritative version of a data container and associated data buffer stored on its serviced volumes;
   a network element of a node adapted to redirect a data access request for the data container and associated data buffer to the disk element;
   a local cache of the network element adapted to provide caching of the data buffer, the cached data buffer having an associated current cache sequence number wherein the current cache sequence number comprises a load generation value and an update count value, wherein the load generation value is incremented every time an inode of the data container is loaded into a memory of the disk element and wherein the update count value of the data buffer is incremented each time the buffer is modified as long as the inode remains loaded in memory; and
   wherein the network element uses the cached data buffer to service the data access request when the current cache sequence number represents a most recent version of the data buffer.

10. Apparatus adapted to ensure consistency of data containers and associated data buffers stored on one or more volumes served by a plurality of nodes connected as a cluster, the apparatus comprising:
    means for tagging each data buffer of each data container with a current cache sequence number comprising a load generation value and an update count value;
    means for incrementing the load generation value every time an inode of a data container is loaded into a memory of a node;
    means for loading a data buffer of the data container into the memory; and
    means for incrementing the update count value of the data buffer each time the buffer is modified as long as its inode remains loaded in memory.

11. The apparatus of claim 10 wherein each node comprises a disk element adapted to service the one or more volumes of the cluster and a network element adapted to redirect a data access request for a data container to any disk element of the cluster.

12. The apparatus of claim 11 further comprising means for maintaining an authoritative version of the data container and associated data buffer at the disk element.

13. The apparatus of claim 12 further comprising means for caching a version of the data buffer at the network element.

14. The apparatus of claim 13 further comprising:
means for receiving a data access request from a client directed to the data container at the network element;
means for forwarding a message to the appropriate disk element to validate the data buffer cached at the network element;
means for determining whether the data buffer cached at the network element is representative of a most recent version of the data buffer; and
if so, means for returning a response to the network element indicating that the cached buffer can be used to service the request.

15. The apparatus of claim 14 further comprising one of, if the data buffer cached at the network element is not representative of a most recent version of the data buffer:
means for returning a copy of the updated data buffer to the network element as part of the response from the disk element; and
means for returning the response indicating that the cached buffer is stale.

16. A computer readable medium containing executable program instructions for ensuring consistency of data containers and associated data buffers stored on one or more volumes served by a plurality of nodes connected as a cluster, the executable instructions comprising one or more program instructions for:
tagging each data buffer of each data container with a current cache sequence number comprising a load generation value and an update count value;
incrementing the load generation value every time an inode of a data container is loaded into a memory of a node;
loading a data buffer of the data container into the memory; and
incrementing the update count value of the data buffer each time the buffer is modified as long as its inode remains loaded in memory.

17. The computer readable medium of claim 16 wherein each node comprises a disk element adapted to service the one or more volumes of the cluster and a network element adapted to redirect a data access request for a data container to any disk element of the cluster.

18. The computer readable medium of claim 17 further comprising one or more program instructions for maintaining an authoritative version of the data container and associated data buffer at the disk element.

19. The computer readable medium of claim 18 further comprising one or more program instructions for caching a version of the data buffer at the network element.

20. The computer readable medium of claim 19 further comprising one or more program instructions for:
receiving a data access request from a client directed to the data container at the network element;
forwarding a first message to the appropriate disk element to validate the data buffer cached at the network element;
determining whether the data buffer cached at the network element is representative of a most recent version of the data buffer; and
if so, returning a response to the network element indicating that the cached buffer can be used to service the request.

21. The computer readable medium of claim 20 further comprising one or more program instructions for, if the data buffer cached at the network element is not representative of a most recent version of the data buffer:
returning a copy of the updated data buffer to the network element as part of the response from the disk element; or
returning the response indicating that the cached buffer is stale.

* * * * *